US008089750B2

(12) United States Patent  (10) Patent No.: US 8,089,750 B2
Chen et al. (45) Date of Patent: *Jan. 3, 2012

(54) MULTI-SECTIONED ARMS FOR PORTABLE ELECTRONIC DEVICES

(75) Inventors: Shaofen Chen, Plano, TX (US); Zhaofang Wen, Plano, TX (US)

(73) Assignee: Computer ErgoTech, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/999,620

(22) Filed: Dec. 6, 2007

(65) Prior Publication Data

US 2008/0094792 A1 Apr. 24, 2008

Related U.S. Application Data

(63) Continuation-in-part of application No. 11/713,269, filed on Mar. 2, 2007, which is a continuation of application No. 11/252,671, filed on Oct. 18, 2005, now Pat. No. 7,215,538, application No. 11/999,620, which is a continuation-in-part of application No. PCT/US2006/040604, filed on Oct. 17, 2006, and a continuation-in-part of application No. 11/725,294, filed on Mar. 19, 2007.

(51) Int. Cl.
G06F 1/16 (2006.01)
H05K 5/00 (2006.01)
H05K 7/00 (2006.01)

(52) U.S. Cl. ............... 361/679.26; 248/278.1

(58) Field of Classification Search .. 361/679.21–679.3, 361/679.55; 248/278.1
See application file for complete search history.

(56) References Cited

U.S. PATENT DOCUMENTS

| 4,562,987 | A | * | 1/1986 | Leeds et al. | 248/278.1 |
| 4,783,036 | A | * | 11/1988 | Vossoughi | 248/281.11 |
| 4,834,329 | A | * | 5/1989 | Delapp | 248/183.3 |
| 4,846,434 | A | * | 7/1989 | Krogsrud | 248/284.1 |
| 4,859,092 | A | * | 8/1989 | Makita | 400/83 |
| 4,864,601 | A | * | 9/1989 | Berry | 379/93.07 |
| D313,405 | S | * | 1/1991 | Barry et al. | D14/376 |
| 5,161,766 | A | * | 11/1992 | Arima | 248/447 |
| 5,255,214 | A | | 10/1993 | Ma | |
| 5,329,289 | A | * | 7/1994 | Sakamoto et al. | 248/922 |
| 5,373,333 | A | * | 12/1994 | Kawada et al. | 353/122 |
| 5,383,138 | A | * | 1/1995 | Motoyama et al. | 361/679.27 |
| 5,548,478 | A | | 8/1996 | Kumar et al. | |
| 5,553,820 | A | * | 9/1996 | Karten et al. | 248/286.1 |
| 5,668,570 | A | | 9/1997 | Ditzik | |
| 5,729,429 | A | * | 3/1998 | Margaritis et al. | 361/679.28 |
| 5,805,415 | A | | 9/1998 | Tran et al. | |
| 5,992,809 | A | * | 11/1999 | Sweere et al. | 248/278.1 |

(Continued)

*Primary Examiner* — Jinhee Lee
*Assistant Examiner* — Adrian S Wilson

(57) ABSTRACT

Multi-sectioned arms are used as a basic mechanism for coupling the display and the base of a portable computer. With this mechanism, one single computer can support all of the following capabilities. The display can move continuously, relative to the back edge of the base, along any combination of up and down, backward and forward, and left and right directions. The display can be tilted up and down as well as sideway for viewing angle adjustment, and also set to portrait and landscape orientations. When the display is in conventional open or close positions, each arm can be folded and parked alongside and parallel to as well as away from the edge of the base. The arms can be detached from the computer. The base and the display can overlay each other in four ways. Finally, mechanical mechanisms for implementations of the arms and connections to the computer are presented.

11 Claims, 34 Drawing Sheets

U.S. PATENT DOCUMENTS

| | | |
|---|---|---|
| 6,005,767 A | 12/1999 | Ku et al. |
| 6,016,171 A | 1/2000 | Tsao |
| 6,019,332 A * | 2/2000 | Sweere et al. ............. 248/284.1 |
| 6,134,103 A | 10/2000 | Ghanma |
| 6,168,250 B1 * | 1/2001 | Rogov .......................... 312/294 |
| 6,189,850 B1 * | 2/2001 | Liao et al. ................. 361/679.21 |
| 6,233,138 B1 | 5/2001 | Osgood |
| 6,262,885 B1 | 7/2001 | Emma et al. |
| 6,343,006 B1 * | 1/2002 | Moscovitch et al. .... 361/679.04 |
| 6,353,529 B1 | 3/2002 | Cies |
| 6,381,128 B1 | 4/2002 | Kramer |
| 6,392,877 B1 | 5/2002 | Iredale |
| 6,430,038 B1 | 8/2002 | Helot et al. |
| 6,437,973 B1 | 8/2002 | Helot et al. |
| 6,464,195 B1 | 10/2002 | Hildebrandt |
| 6,480,373 B1 | 11/2002 | Landry et al. |
| 6,504,707 B2 | 1/2003 | Agata et al. |
| 6,522,529 B1 * | 2/2003 | Huilgol et al. ........... 361/679.06 |
| 6,532,147 B1 | 3/2003 | Christ, Jr. |
| 6,639,788 B1 * | 10/2003 | Liao et al. ................. 361/679.22 |
| 6,665,175 B1 | 12/2003 | deBoer et al. |
| 6,700,773 B1 | 3/2004 | Adriaansen et al. |
| 6,752,363 B2 * | 6/2004 | Boele ......................... 248/183.1 |
| 6,758,454 B2 * | 7/2004 | Smed ............................ 248/314 |
| 6,816,365 B2 | 11/2004 | Hill et al. |
| 6,826,043 B2 | 11/2004 | Chang |
| 6,912,121 B2 | 6/2005 | Karidis et al. |
| 6,947,279 B2 | 9/2005 | Cheng et al. |
| 7,091,961 B2 * | 8/2006 | Ditzik ....................... 361/679.27 |
| 7,114,688 B2 * | 10/2006 | Rudolf ....................... 248/278.1 |
| 7,124,989 B1 * | 10/2006 | Lee et al. ................. 248/288.11 |
| 7,296,774 B2 * | 11/2007 | Oh ................................ 248/324 |
| 7,639,484 B2 * | 12/2009 | Chen et al. ............... 361/679.21 |
| 2001/0017761 A1 | 8/2001 | Ditzik |
| 2004/0031894 A1 * | 2/2004 | Smed ......................... 248/278.1 |
| 2004/0057197 A1 | 3/2004 | Hill et al. |
| 2004/0066614 A1 * | 4/2004 | Hong ............................ 361/683 |
| 2004/0114319 A1 | 6/2004 | Hill et al. |
| 2004/0155167 A1 * | 8/2004 | Carter .......................... 248/324 |
| 2004/0165342 A1 * | 8/2004 | Chang ........................... 361/681 |
| 2004/0262474 A1 * | 12/2004 | Boks et al. ................. 248/276.1 |
| 2006/0126284 A1 | 6/2006 | Moscovitch ................. 361/681 |
| 2006/0185563 A1 | 8/2006 | Sweere et al. |
| 2008/0232044 A1 * | 9/2008 | Moscovitch ................. 361/681 |

\* cited by examiner

FIG.1
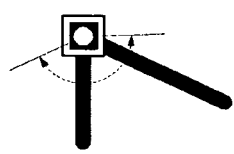
FIG.2A
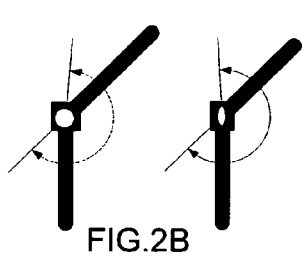
FIG.2B
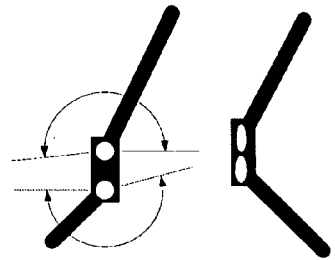
FIG.2C
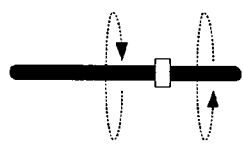
FIG.2D
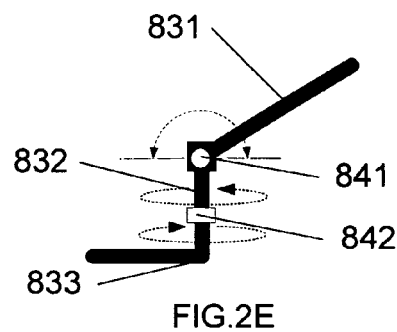
FIG.2E
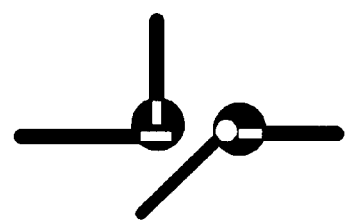
FIG.2F
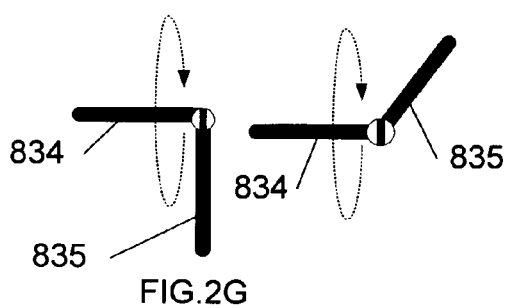
FIG.2G
FIG. 2H
FIG.2

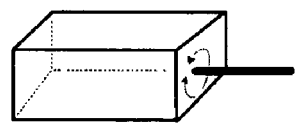
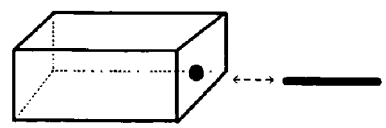
FIG.3A  FIG.3B
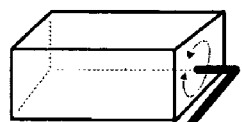
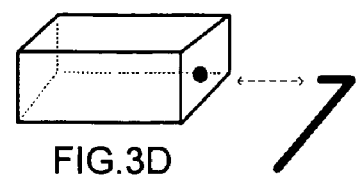
FIG.3C  FIG.3D
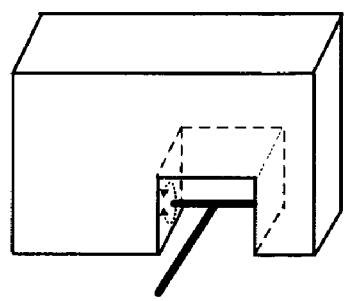
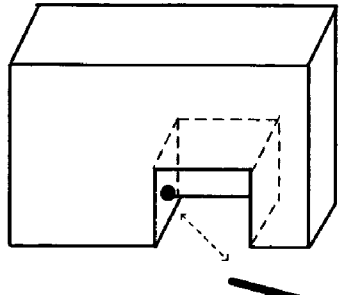
FIG.3E  FIG.3F
FIG.3
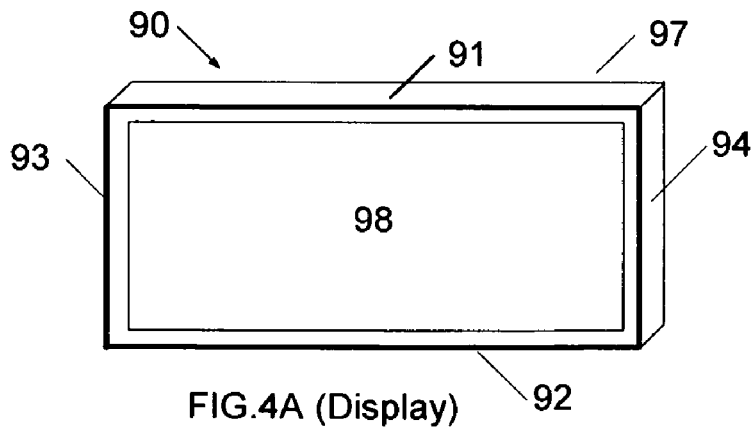
FIG.4A (Display)
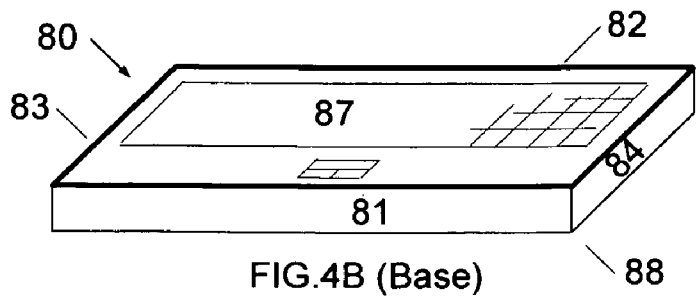
FIG.4B (Base)
FIG.4

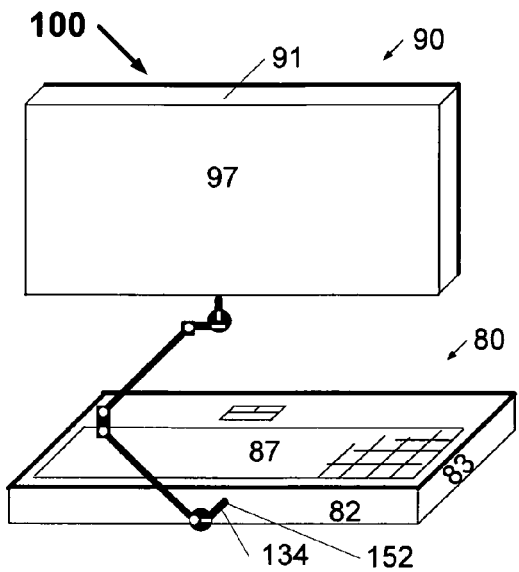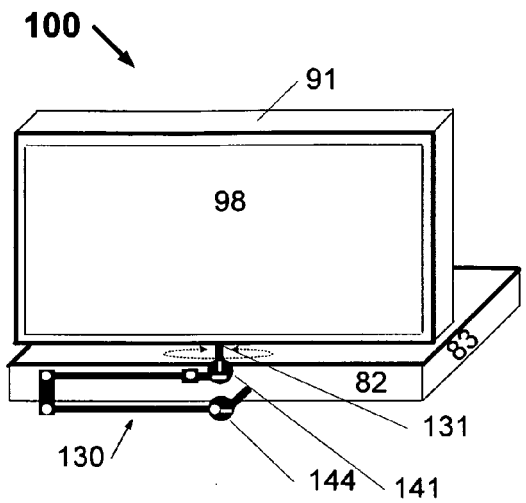
FIG.13                    FIG.14
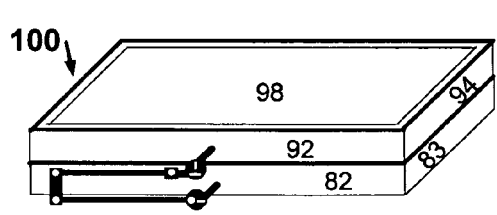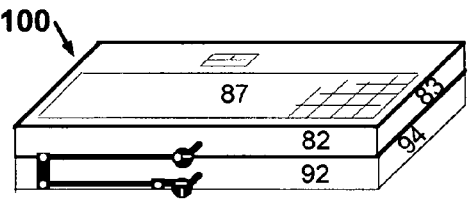
FIG.15            FIG.17
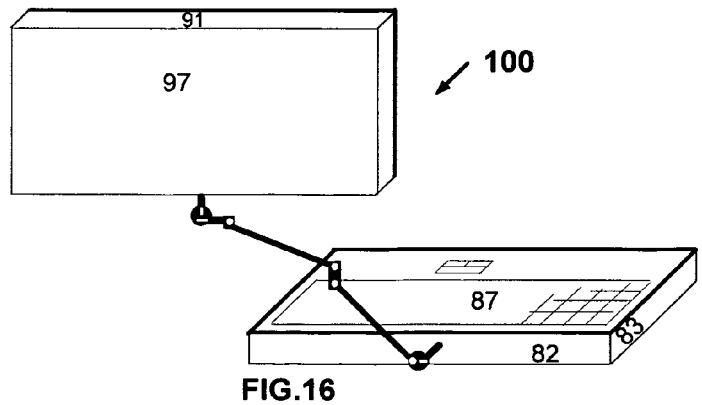
FIG.16

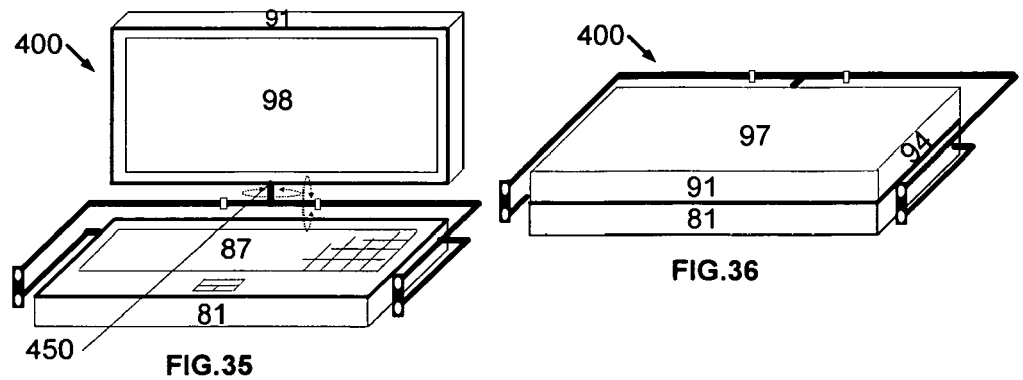
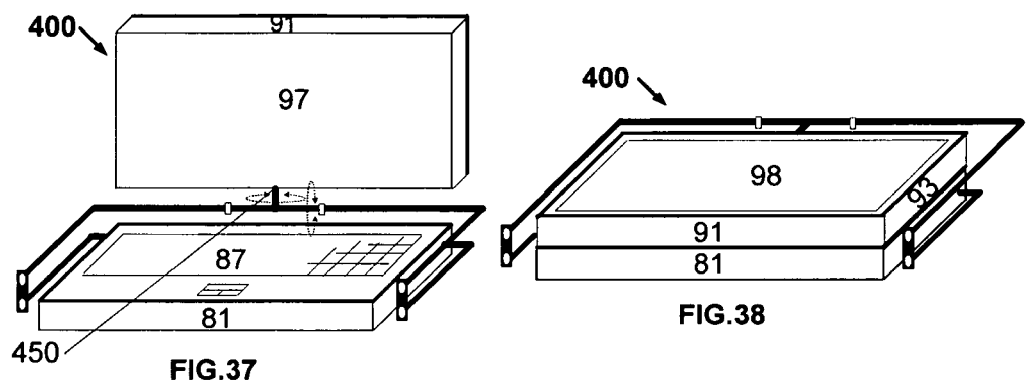
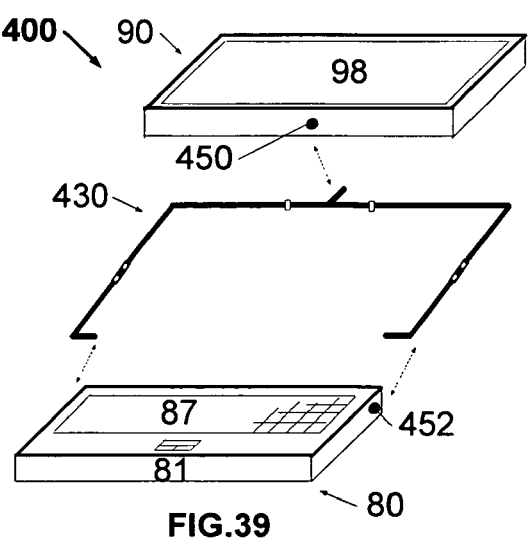

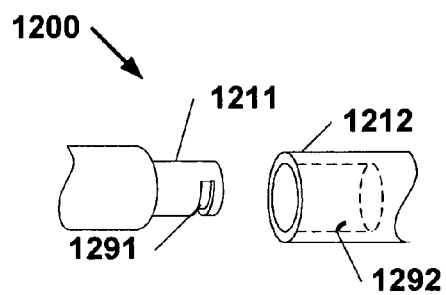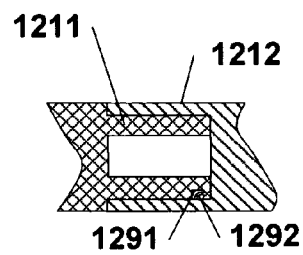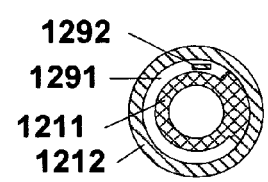
FIG.45A   FIG.45B   FIG.45C
FIG.45
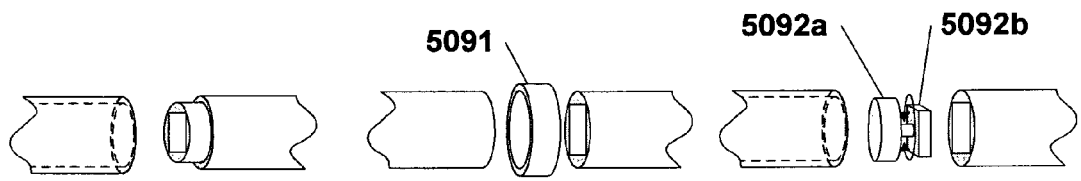
FIG.46A   FIG.46B   FIG.46C
FIG.46

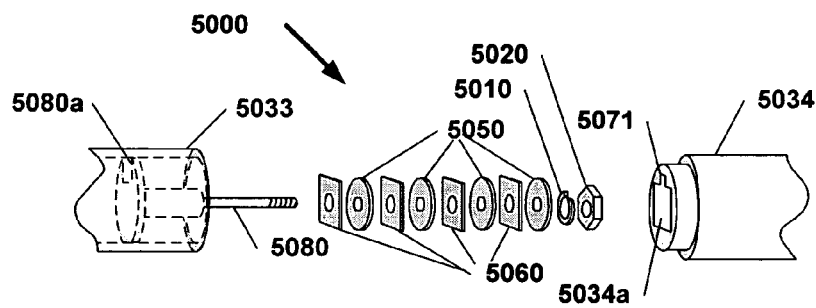
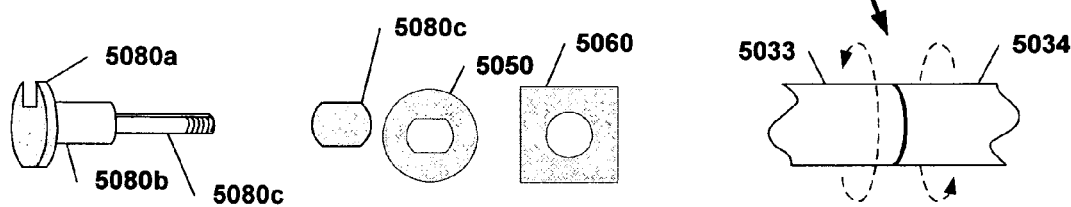
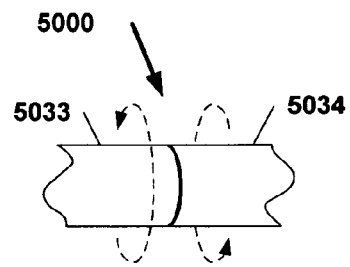
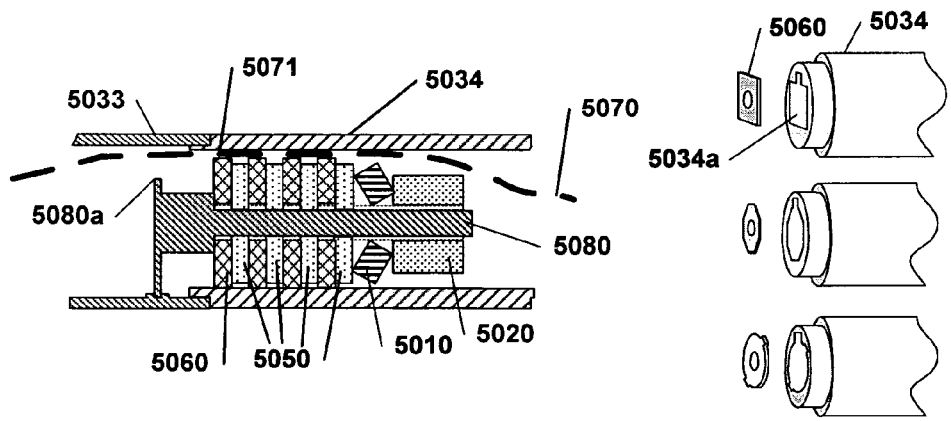
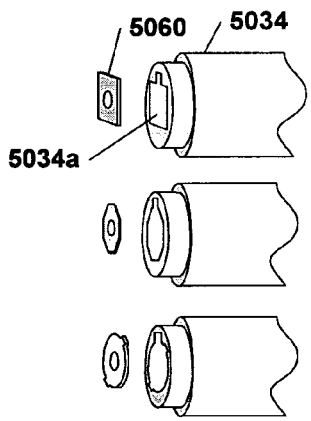
FIG. 47

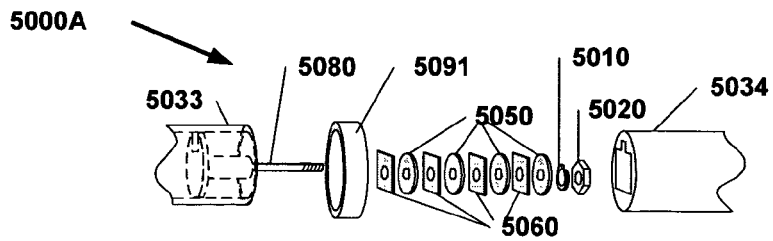
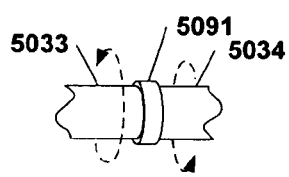
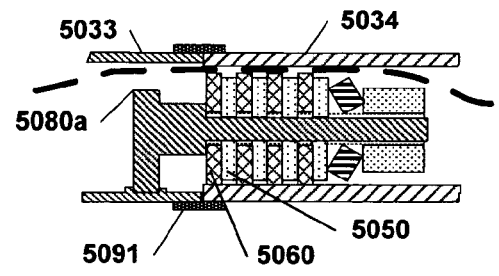
FIG.48A
FIG.48B
FIG.48C
FIG.48
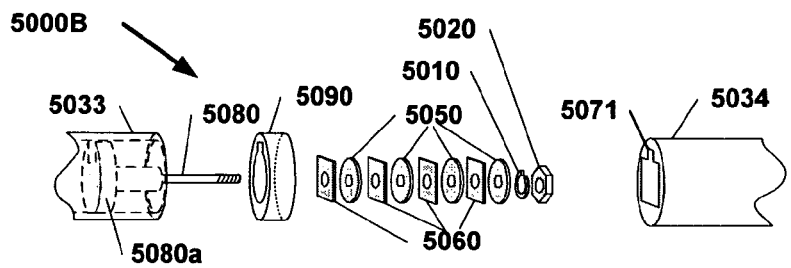
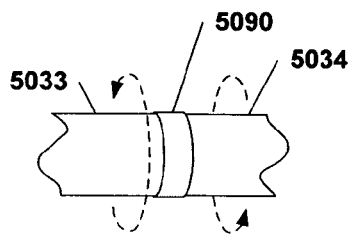
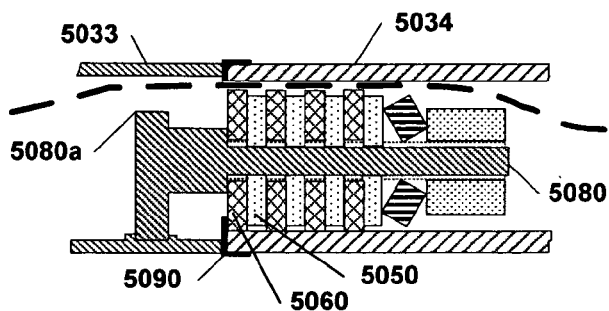
FIG.49A
FIG.49B
FIG.49C
FIG.49

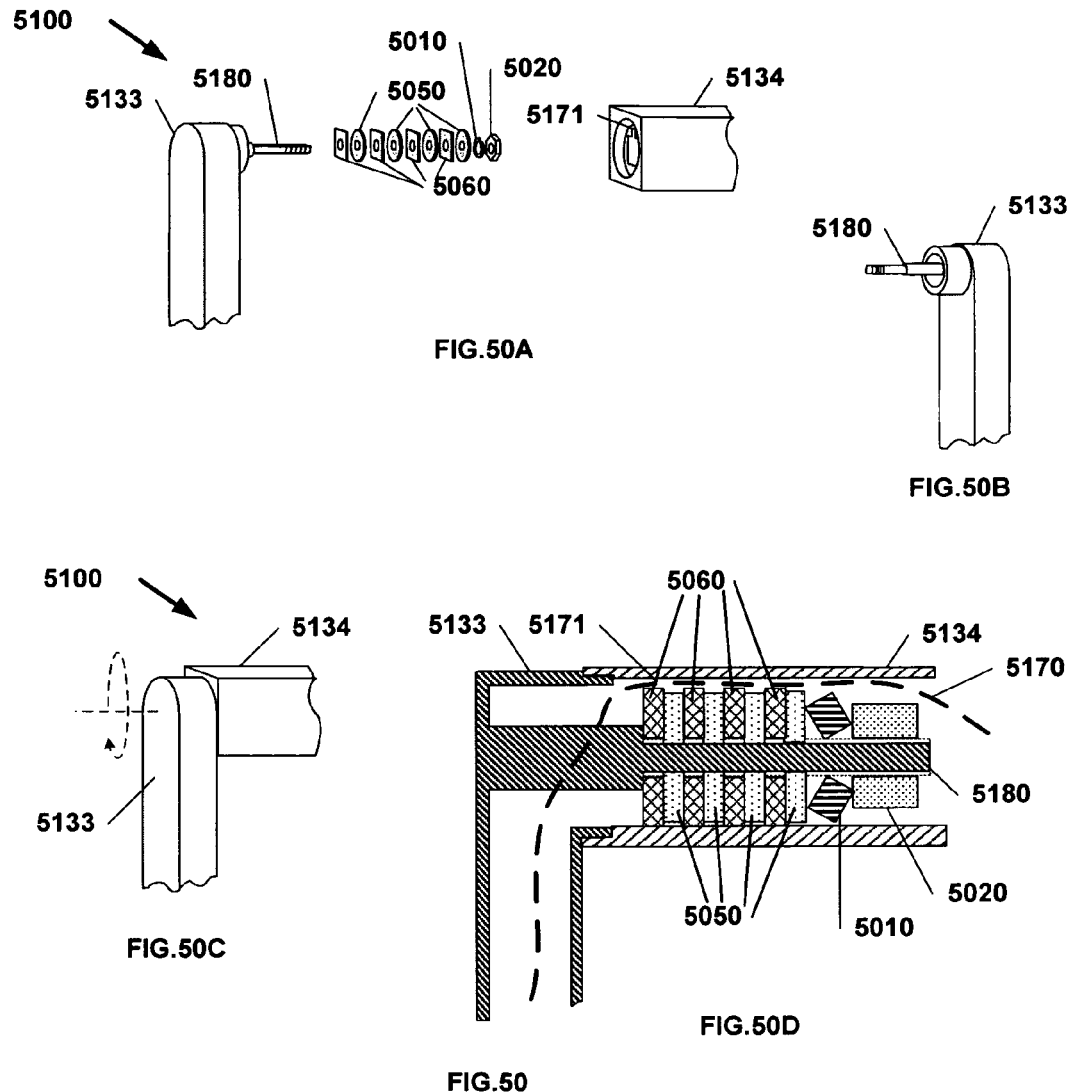

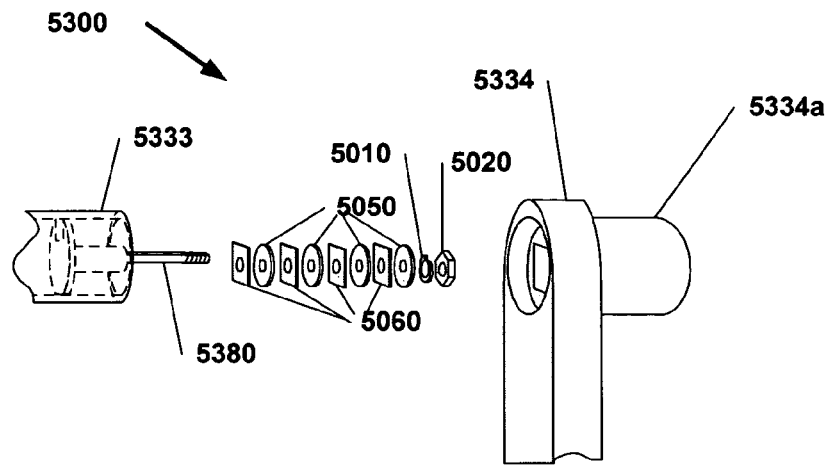
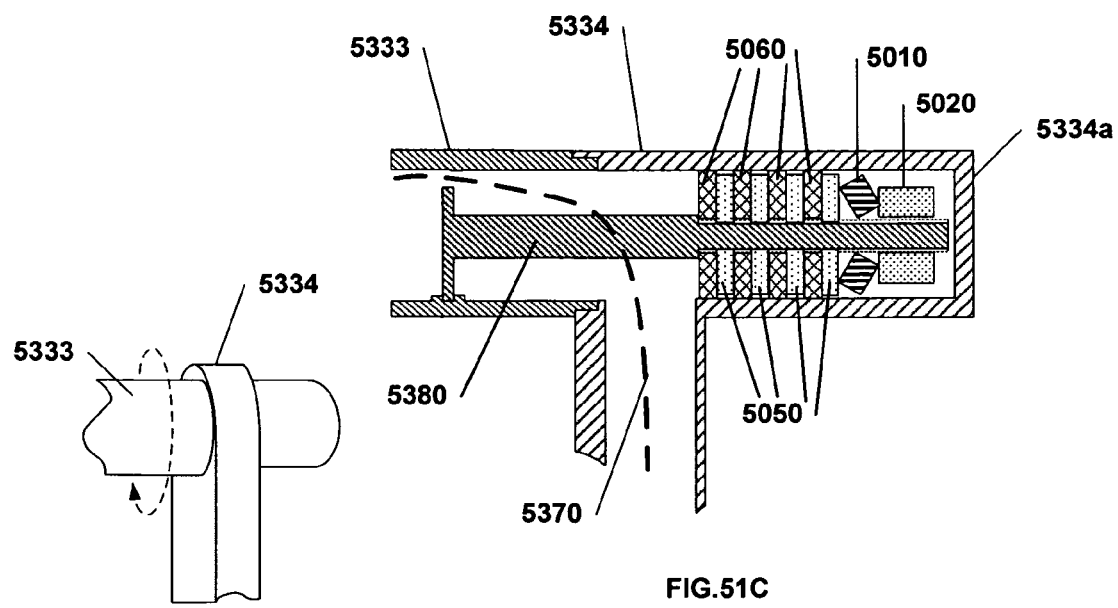
FIG.51A
FIG.51B
FIG.51C
FIG.51

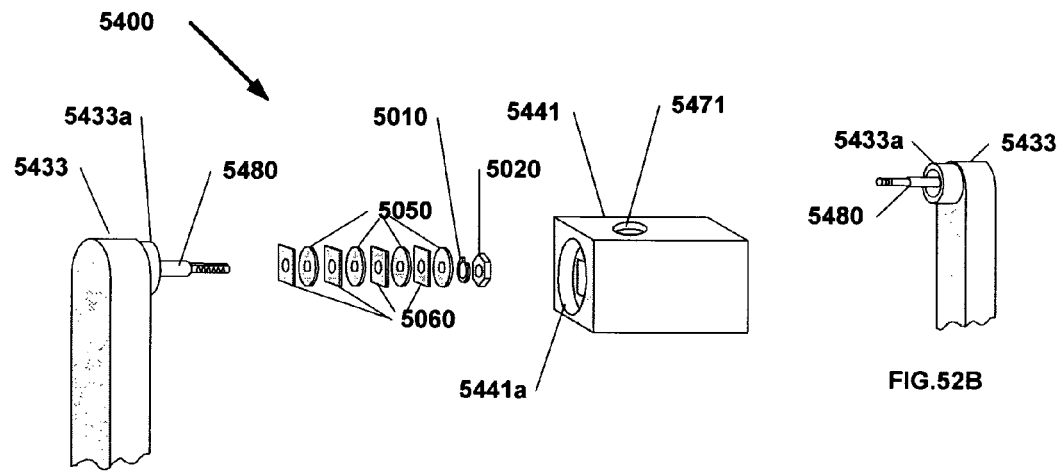
FIG.52A
FIG.52B
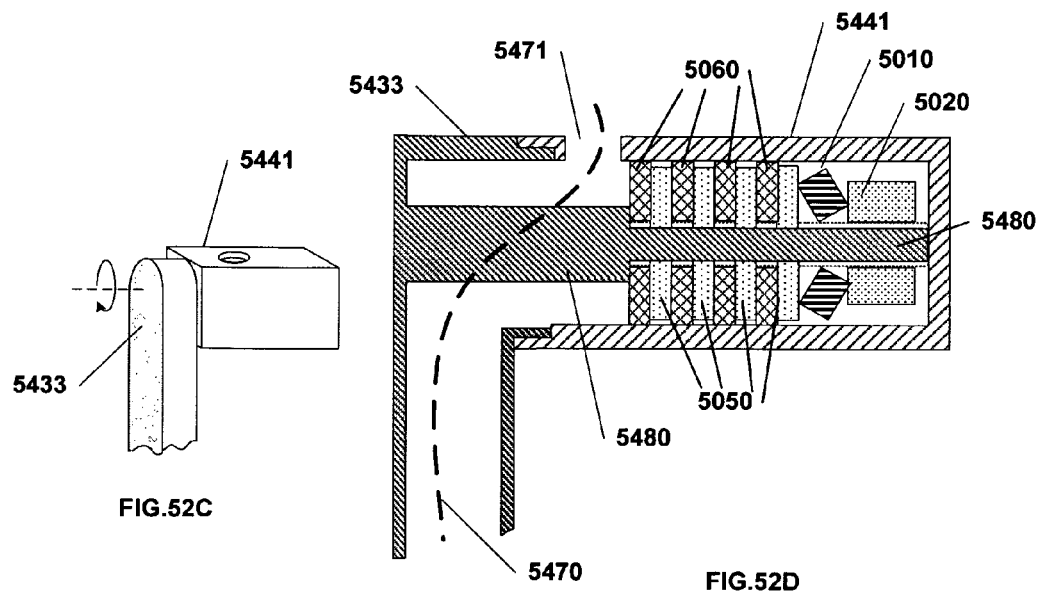
FIG.52C
FIG.52D
FIG.52

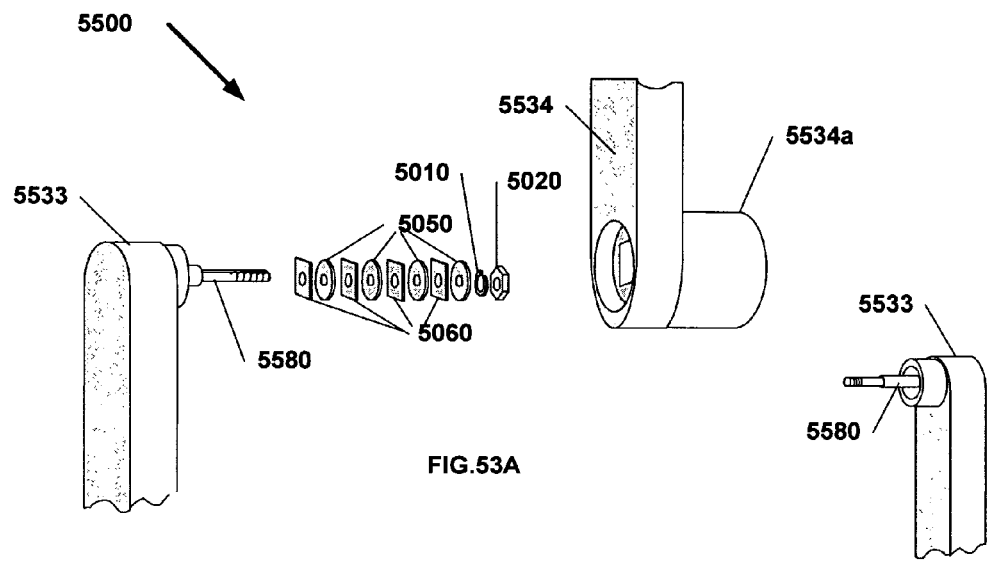
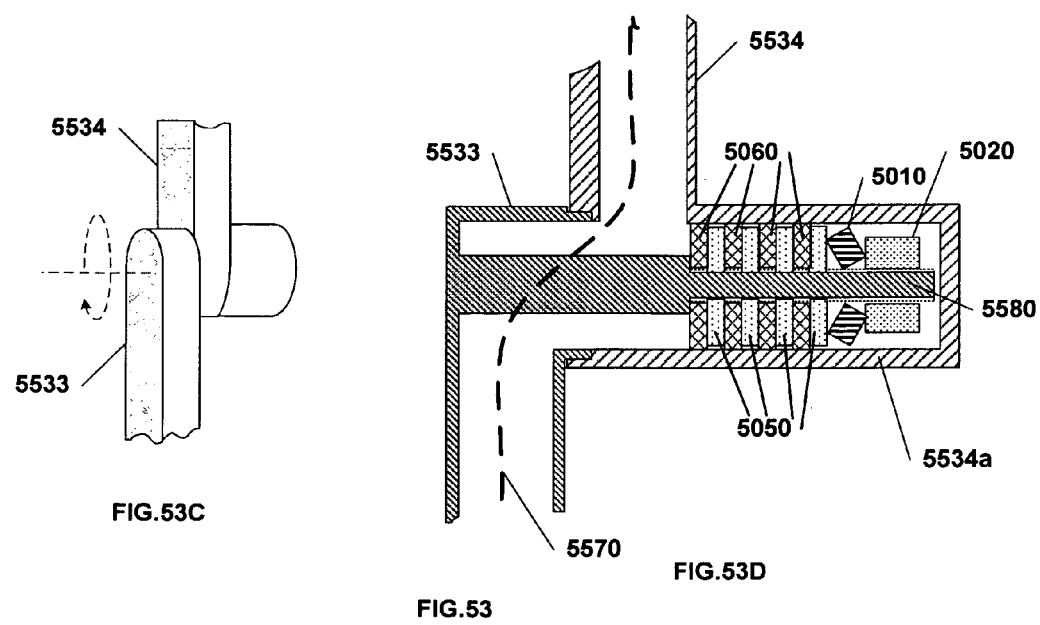
FIG.53

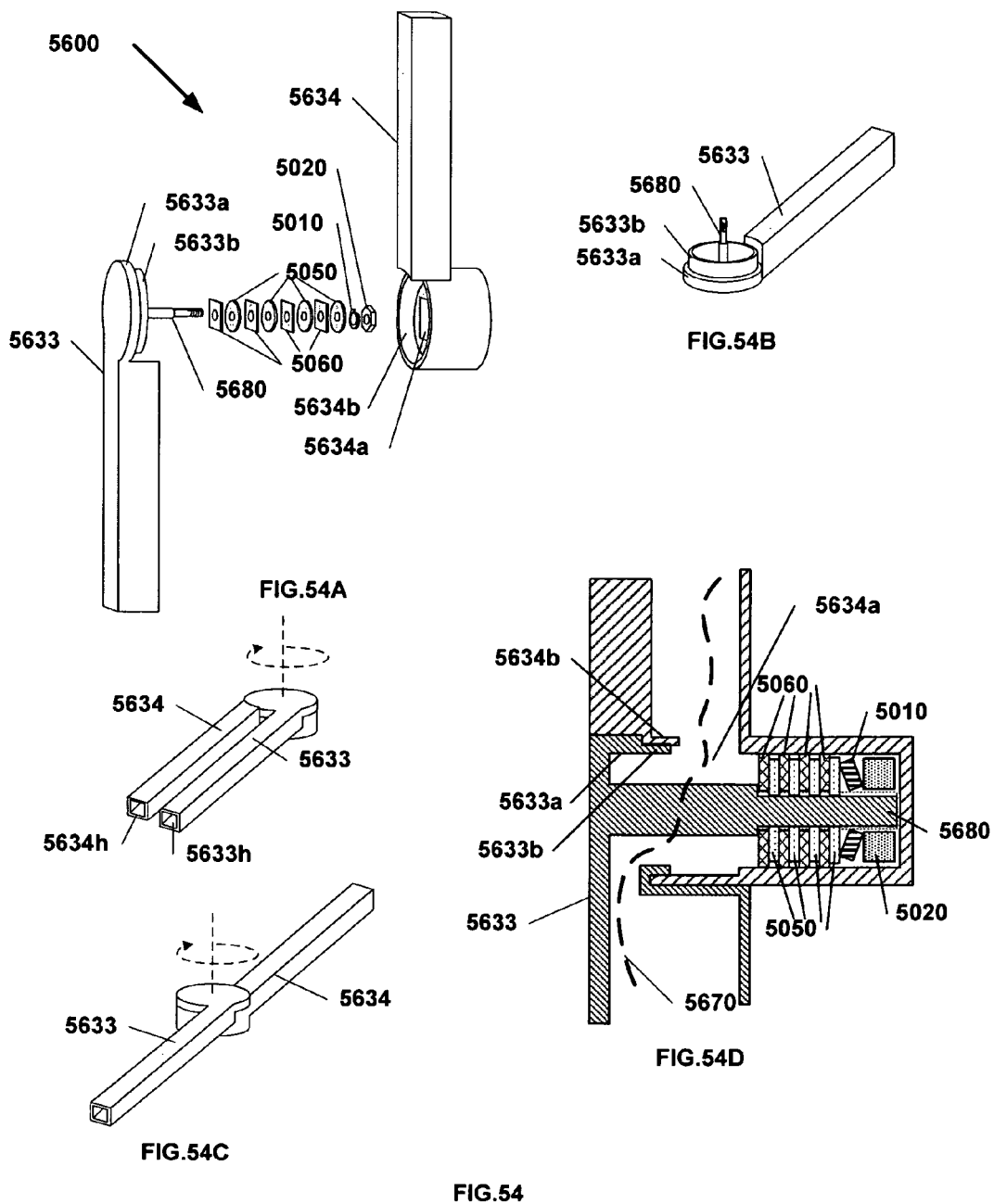

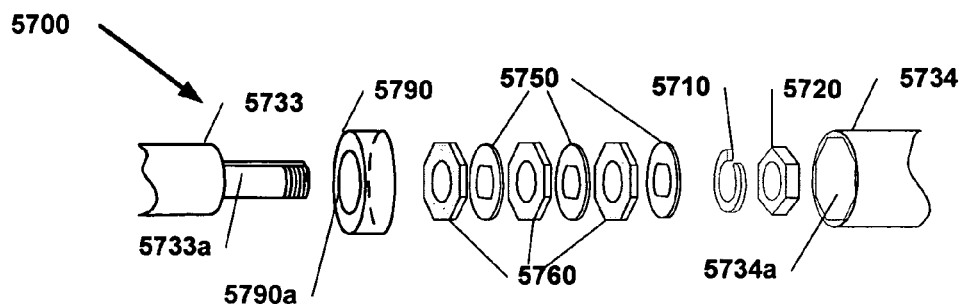
FIG.55A
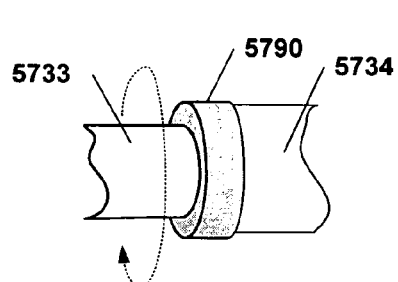
FIG.55B
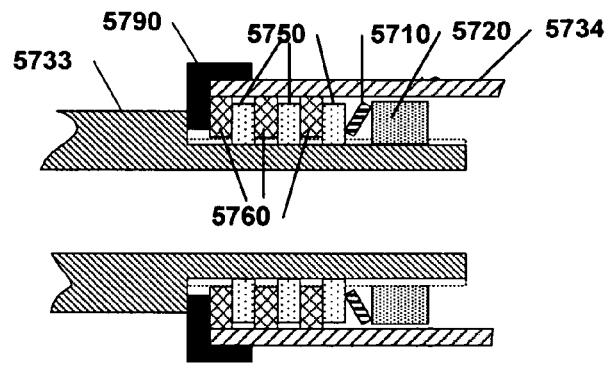
FIG.55C
FIG.55

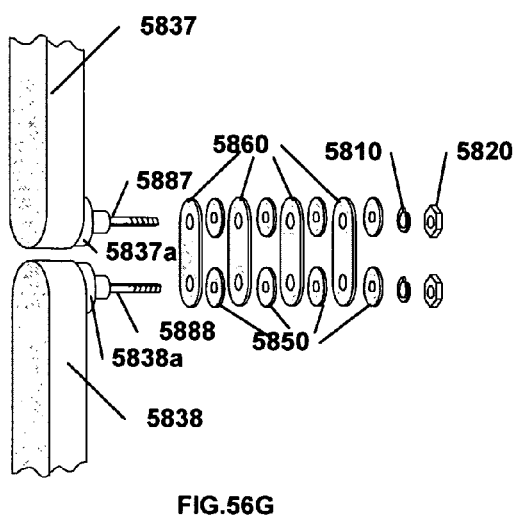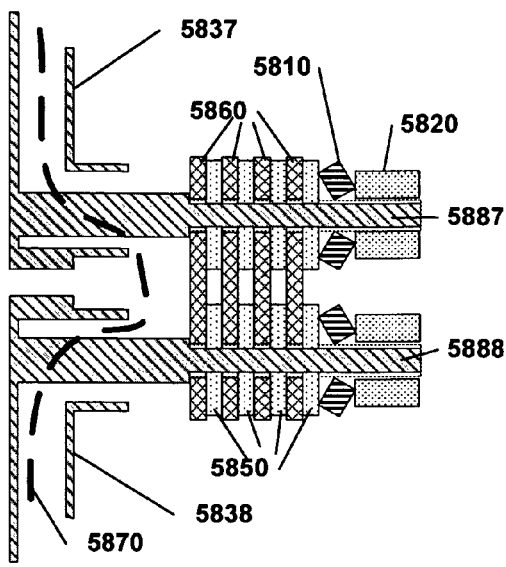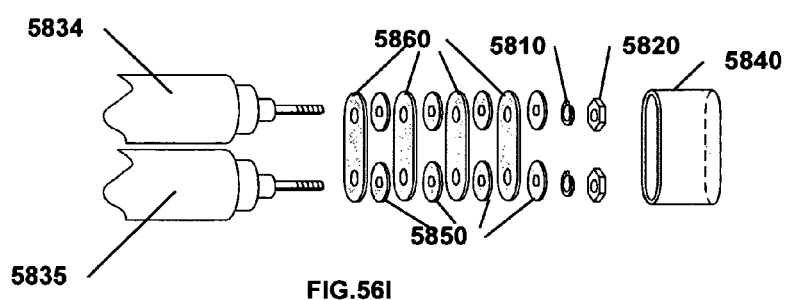
FIG. 56 (continued)

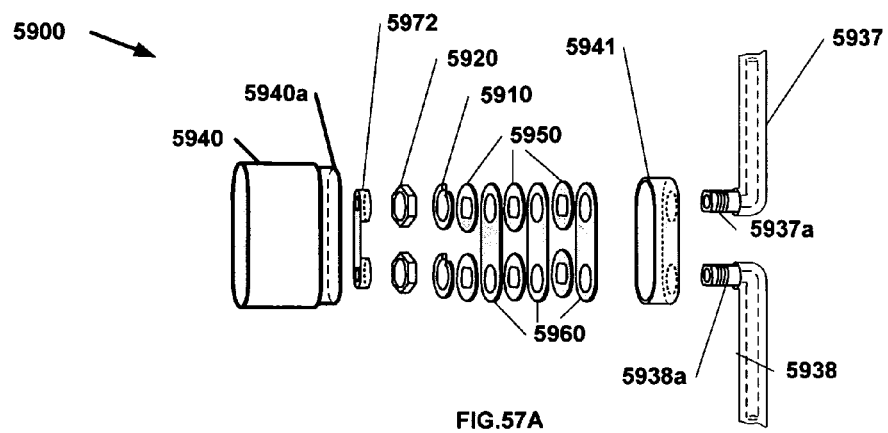
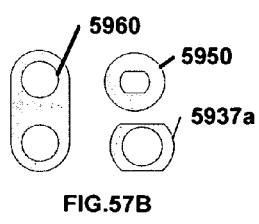
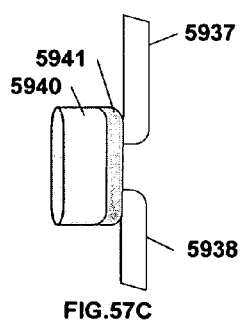
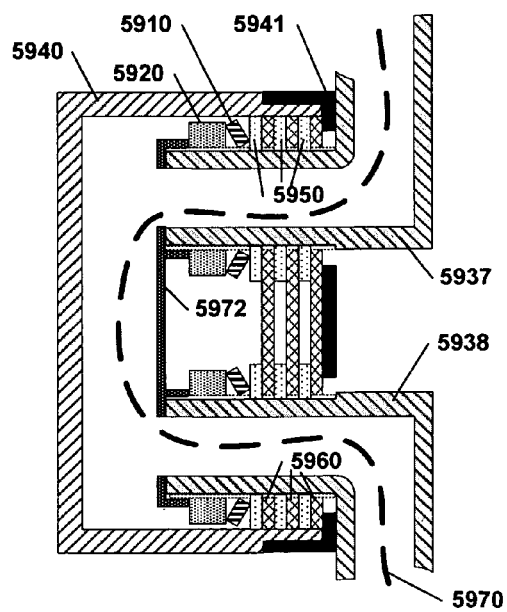
FIG. 57

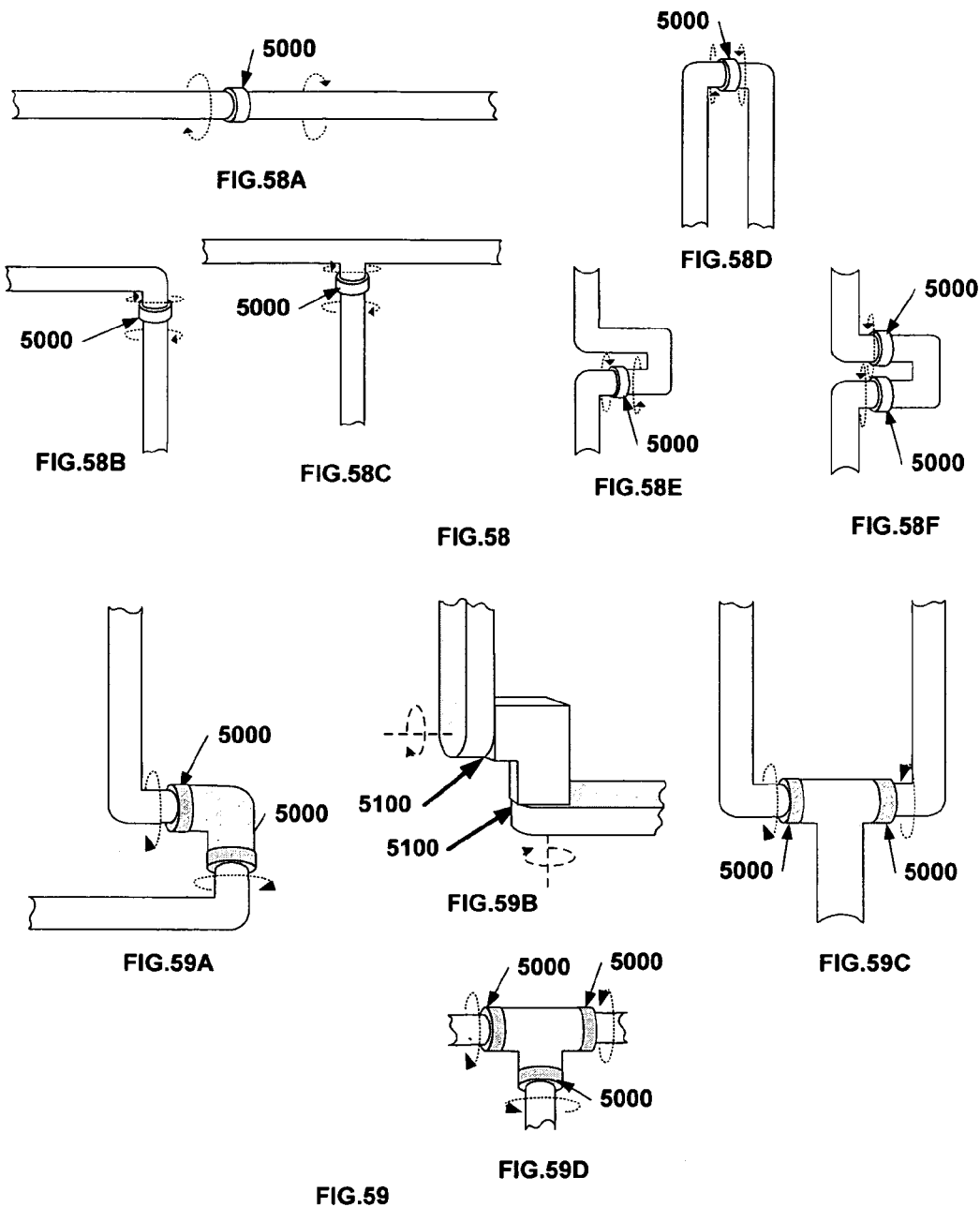

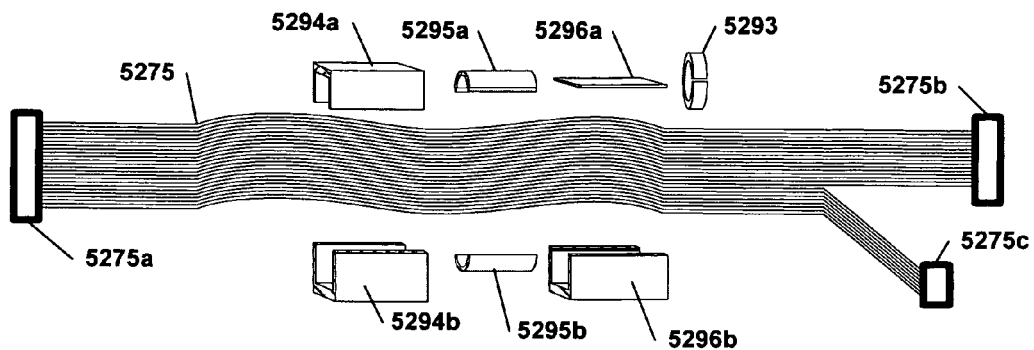
FIG.60A
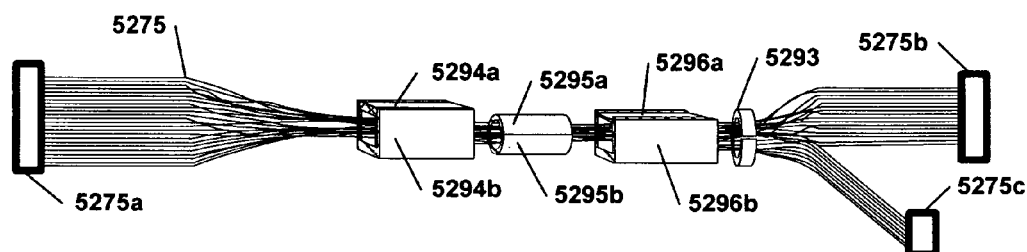
FIG.60B
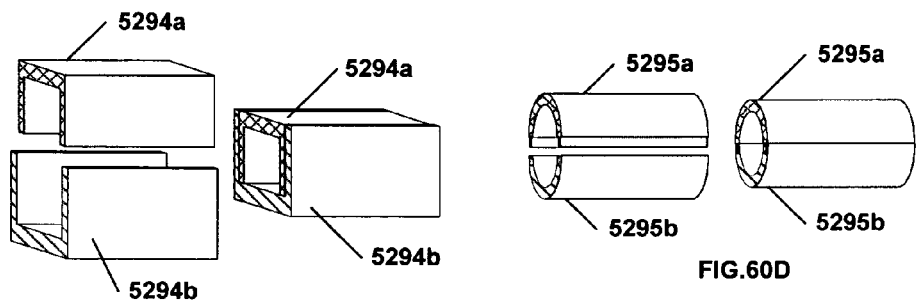
FIG.60C
FIG.60D
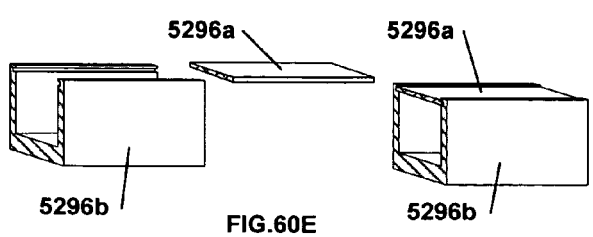
FIG.60E
FIG.60
FIG.60F

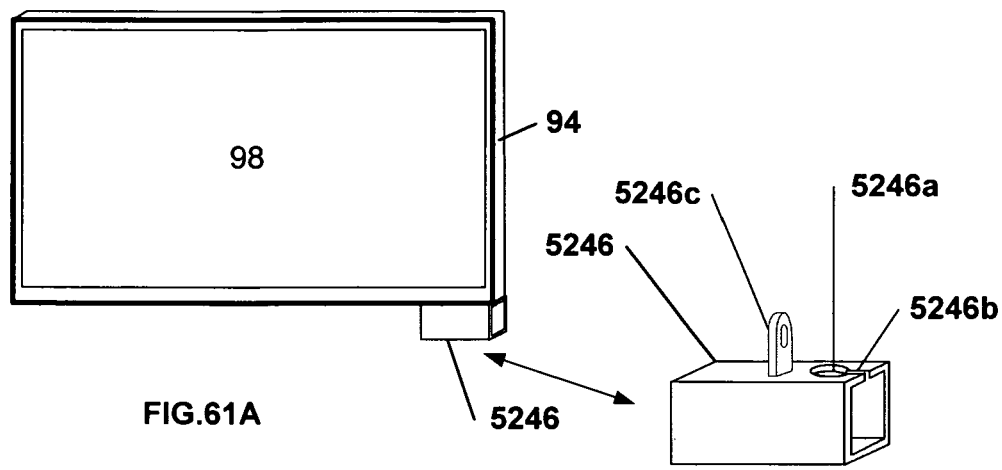
FIG.61A
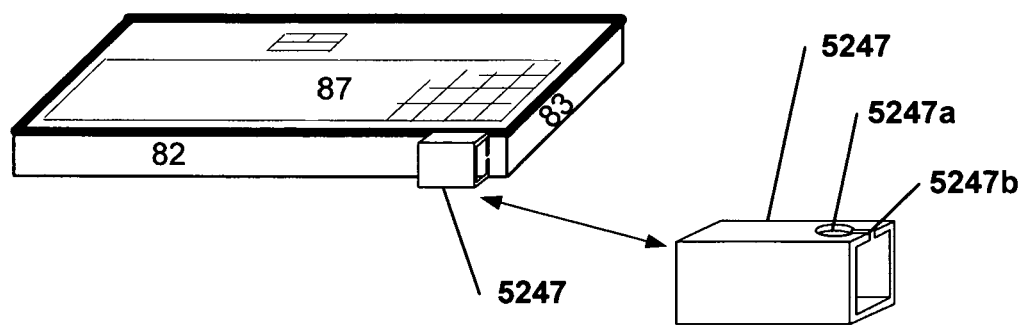
FIG.61B
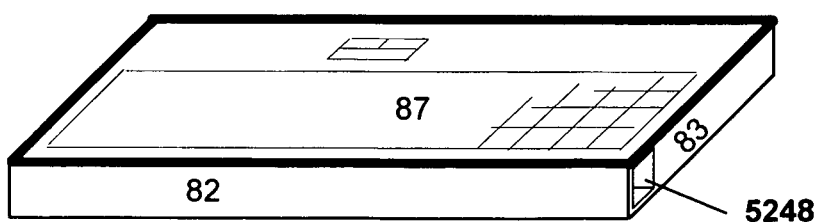
FIG.61C
FIG.61

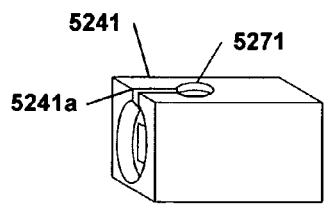
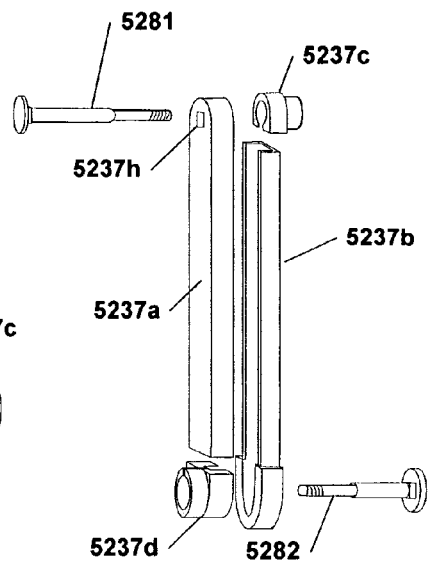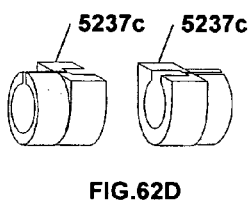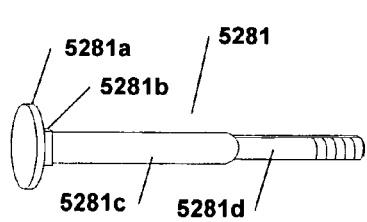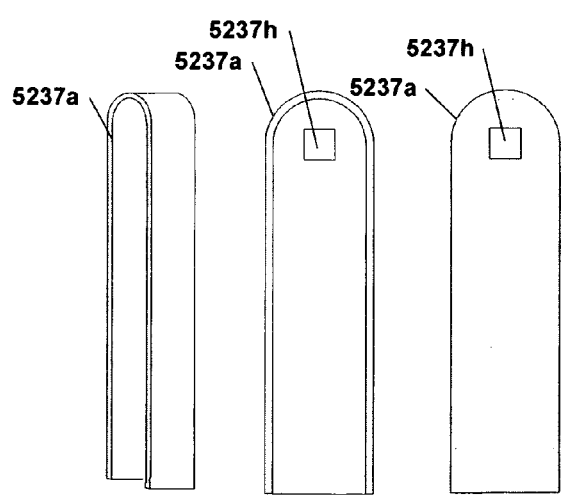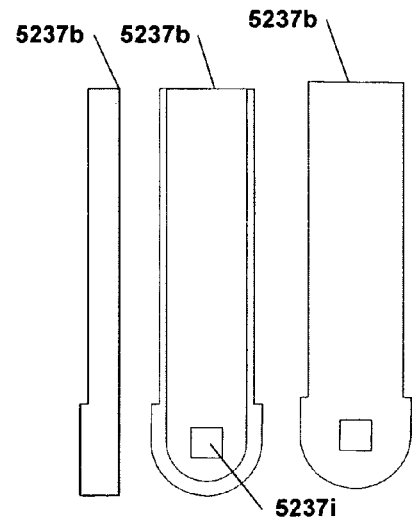
FIG. 62 (continued)

MULTI-SECTIONED ARMS FOR PORTABLE ELECTRONIC DEVICES

CROSS-REFERENCE TO RELATED APPLICATIONS

This application is a continuation-in-part application of and claims priority from the following patent applications:
1) U.S. patent application Ser. No. 11/713,269, filed on Mar. 2, 2007, which is a continuation application of U.S. patent application Ser. No. 11/252,671, filed on Oct. 18, 2005, now issued as U.S. Pat. No. 7,215,538, entitled "Portable Computer with Multi-Sectioned Arms to Support Display Position Adjustment and Multiple Configurations",
2) PCT international application No. PCT/US2006/040604, filed Oct. 17, 2006, entitled "MULTI-SECTIONED ARM FOR DISPLAY OF PORTABLE COMPUTING DEVICES", and
3) U.S. patent application Ser. No. 11/725,294, filed Mar. 19, 2007, entitled "Multi-sectioned arm for portable electronic devices", which is a continuation-in-part application of U.S. patent application Ser. No. 11/252,671, filed on Oct. 18, 2005, now issued as U.S. Pat. No. 7,215,538.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISC APPENDIX

Not Applicable

FIELD OF THE INVENTION

The present invention generally relates to a computer and other electronic devices. More specifically, the invention relates to portable computers having an adjustable display.

BACKGROUND

Technological advancements have enabled portable computers to be built in various forms such as notebooks, tablet PC, personal digital assistants (PDA), and even video game players, and portable DVD players. In this patent application, we use the following terms "portable computer", "portable electronic device", and "portable computing device" interchangeably to refer to these various forms, to which the present invention is not only applicable individually but useful in unifying some of them into one single portable computer with multiple configurations.

A portable computer typically comprises a base and a screen. The computer base generally holds the central processing unit (CPU), memory, electronic circuitry and other components, such as a keyboard, a disk drive. Typically, the base is hinged to the display in a manner in which the display folds down on the base, as shown by the computer (900) in FIG. 5. This design is referred to as the clam shell type enclosure. The display screen is typically connected to the base in such a way that the screen is hidden when the clam shell is closed. That is, the screen faces the upper side (typically, the keyboard) of the base.

There are several disadvantages of the clam shell design. One disadvantage is that the screen and the keyboard are next to each other. If the screen is placed at a comfortable viewing position, it will make the arms and shoulders uncomfortable for typing. On the other hand, if the computer is placed at a comfortable typing position, it would make the neck uncomfortable when looking at the screen. This problem can cause serious computer-related work injuries. Another disadvantage is that it needs to sufficient room to fully open the clam shell computer and position the display screen at an angle of about ninety (90°) or more with respect to the base for normal viewing; and this can be very difficult when operating in tight space, such as on the pull-out tray on the back of a declined airplane seat. Therefore, the clam shell design is insufficient for comfortable use.

In general, it is useful to be able to arrange a single portable computer into various configurations as follows.
(1) Improved Notebook configuration: The display screen can be adjusted to a desirable viewing angle, and to a position by height (up or down relative to the base) and by depth (forward or backward relative to the base's user edge).
(2) Shared viewing configuration: This is configuration (1) plus display adjustment by width (left or right of the space above the keyboard). In addition, this configuration allows the display to tilt left and right relative to the usage orientation of the keyboard. This configuration can be useful when more than one people are looking at the screen at the same time.
(3) Tablet PC configuration: The portable computer is closed with the base stacked underneath the upward-facing screen to be used as input pad. (The keyboard in this configuration can either be facing down or up. But it does not matter.)
(4) Stylus input configuration: The portable computer is open with screen up in normal viewing position; but the bottom side (opposite to the keyboard) of the base is up and used as input pad.
(5) Space saving configuration: The portable computer is closed with the display stacked underneath the base, so that the base can be used as a desktop machine together with a desktop display unit, typically with a bigger and better screen.
(6) Desk note configuration: The display is completely detached from the base so that the base can be used as a desktop machine together with a desktop display unit. (Both this configuration and the Space saving configuration can get the built-in display out of the way of the desktop monitor screen.)
(7) Flexible display orientation configuration: The display screen supports both portrait and landscape viewing orientations.

There have been numerous attempts to support various subsets of these seven configurations. Many of them are focused on the screen viewing position adjustment using various approaches, which are all different from the multi-sectioned arm approach in the present invention. Some others are focused on mode transitioning between conventional notebook and tablet PC. There has been no single invention until now that can solve all seven configurations in a single computer.

The purpose of the present invention is to devise a basic mechanism for supporting all or a select subset of configurations (1)-(7) in one single portable computer.

SUMMARY

The present invention supports, in one single portable computer, all or a subset of configurations (1)-(7) as specified in the Background Section.

A portable computer according to the present invention generally includes a computer base and a display, which are connected together through one or more multi-sectioned arms. Such a multi-sectioned arm includes rotatably linked sections; and it may also include extendably and contractibly linked sections. The electronic and electric wiring cable between the base and the display can run completely inside one or more of the arms. The wiring cable can also run separately without going through the arm (or arms); and in this case, a retractable cable may be used.

The connection linking each arm to the display (and similarly, the base) can either be a pivotal hinge (connection pivot) or a mounting mechanism as simple as a tunnel to receive an end section of the arm. In either case, the screen's viewing angle can be adjusted, either by rotating the display around the connection pivots (if any), or by turning some of the arm sections relatively to each other.

The arms can be folded and parked alongside the portable computer in closed positions. At the conventional screen viewing position, the folded arms can be turned away so that they do not block the computer base's edges for other uses, such as DVD, network card, and other outlets.

The arms can also be flexibly stretched to allow continuous adjustment of the screen's spatial position by height (up or down relative to the base), depth (forward or backward relative to the base's user edge), and width (left or right away from space above the base). The screen can also be tilted left and right. (See configurations (1) and (2) in the Background section.)

To see the range of screen position adjustment, consider the position of the middle point of the lower edge of the display, relative to the back edge of the base. In the conventional clam shell design (as shown in FIG. 5), this mid-point travels along a pre-determined curve with a semi-diameter about the height of the hinge connection between the base and the display. In contrast, a portable computer of the present invention allows such a mid-point to be positioned at any position in a 3-dimensional range with a diameter about the height of the fully stretched multi-sectioned arm.

By rotating the arm sections and by arranging how the display and the base face each other the portable computer can be set to Configurations (1)-(5). The display can also be set to Configuration (7), i.e., landscape and portrait viewing orientations, and even some slanted orientation. The arms can be detached completely from both the computer base and the display. This not only allows for the computer to be set for the desk note configuration (6), but also makes the arms replaceable or substitutable. Alternatively, some of the configurations can be obtained by detaching the arms, rearranging the arms, the display, and the base, and then re-attaching the arms (if necessary).

Either friction mechanisms or locking mechanisms can be used at the joints and the connection pivots (if any) to keep the arm sections, the base, and the display in their chosen relative positions. There are mechanisms at the joints and the connection pivots to limit how much the attached arm sections can rotate or turn. (This can prevent potential wiring and other damages from unlimited rotating and turning.) There are also locking mechanisms to secure each arm's connections to the base and the display.

For illustration, several embodiments of the computer according to this invention are presented, based on the numbers of arms and sections in each arm as well as how the each arm is connected to the computer base and the display. First, for simplicity of presentation, drawings of these embodiments are done using several notations representing basic parts such as arm sections and ways for linking them, assuming these notations can be implemented mechanically based on current mechanical manufacturing capabilities in the field. Then we provide detailed mechanical mechanisms for the implementations of these basic parts. Last, a preferred embodiment of a portable computer according the present invention is presented to show how the mechanical mechanisms can be used together.

Typically, the computer base has two sides and four edges: the keyboard side, the bottom side (opposite to the keyboard), the left edge, right edge, the front edge (user edge), and the back edge. The display also has two sides and four edges: the screen side, the back side (opposite to the screen), the left and right edges, and the upper and lower edges (from the user's point of view). (Note: These features of the base and the display are listed for convenience in the presentation. The present invention is not limited to portable computers having exactly these features.)

In the first embodiment, one single multi-sectioned arm is connected to the back edges of the base and the display. In the second embodiment, two double-sectioned arms connect the base and the display by their side edges, with one on the left and the other on the right. The third embodiment is an extension of the second embodiment by replacing the two-sectioned side arms with side arms using combo-joints, thus enabling the display to move sideways (left and right relative to the base). In the fourth embodiment, a bridge arm anchors on the left and the right edges of the computer base, and connects to the lower edge of the display. The fifth embodiment is an extension of the second embodiment by using triple-sections arms (to show that it is possible to use side arms of more than two sections). In the presentations of these embodiments, some simple variations are also mentioned.

Some basic mechanical mechanisms are presented to implement the multi-sectioned arms and connection pivots, including several embodiments of two mechanical friction joint mechanisms, a method for installing a wiring cable inside a multi-sectioned arm when using a cable that is already pre-connected with connectors at its ends, and attachment mechanisms for connecting the arm to the display and the base. Specifically, the mechanical friction joint mechanisms for arm section joints and connection pivots contain friction discs placed in close contact with each other for friction generation. When the linked parts rotate relatively, some discs engage and rotate in sync with one of the parts in one direction, while the rest of the discs rotate in the opposite direction. The discs rotating relatively in opposite directions are interposed, so their rotational friction collectively contributes to the friction of the joint mechanisms. Also, a wiring cable can pass through such a joint mechanism without interfering with the relative rotation of the friction discs. More details of the mechanical structures of the mechanisms will be described later.

It is worth mentioning that the mechanical mechanisms and method presented in this invention also address the following practical and manufacturing issues:

Minimal changes (if any at all) to conventional portable computer base and display enclosures and their connecting cable: For example, the multi-sectioned arms can simply be attached somewhere on the edges and sides of the base and the display; and there is basically no change to the base and the display (inside or outside). Furthermore, most of the conventional cable designs do not need to change either, except to make the cable longer to accommodate for the portion that runs through the arm.

Portability of the same arm (design) to a wide variety of portable computers: For example, the friction joint mechanisms according to the present invention enable scalable levels of friction by varying the number of friction discs in the joint during installation. This allows the same arm design to be portable to different displays.

In summary, all or a subset of configurations (1)-(7) can be supported in one single computer with multi-sectioned arms according to the present invention. This invention also presents mechanical mechanisms to build the arms, and ways to assemble such a computer (especially by adopting the base and the display as well as their connecting cable of a conventional portable computer).

BRIEF DESCRIPTION OF THE DRAWINGS

Drawing Notations

FIG. 1 is a list of notations used in the drawings to represent one of the sections in a multi-sectioned arm in various scenarios.

FIG. 2 is a list of notations used in the drawings to show the relative movements of the arm sections that are linked together.

FIG. 3 is a list of notations in various scenarios an arm can be attached to and detached from the base and the display.

FIG. 4 lists the base and the display of a portable computer. In the drawings of all the embodiments, the base and the display will always use the same labels. (FIG. 4A denotes the display of a portable computer. FIG. 4B denotes the base of a portable computer.)

First Embodiment

Figure 5:
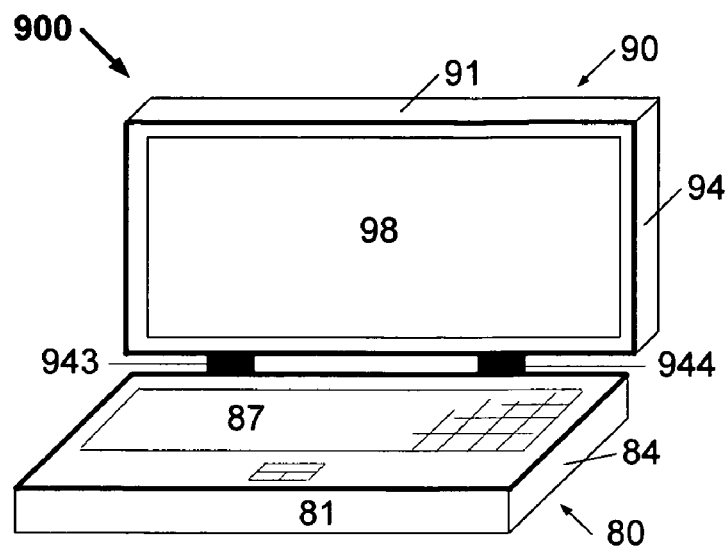
FIG. 5 is a perspective view of a conventional clam shell enclosure design of a portable computer, in an open position.
Figure 6A:
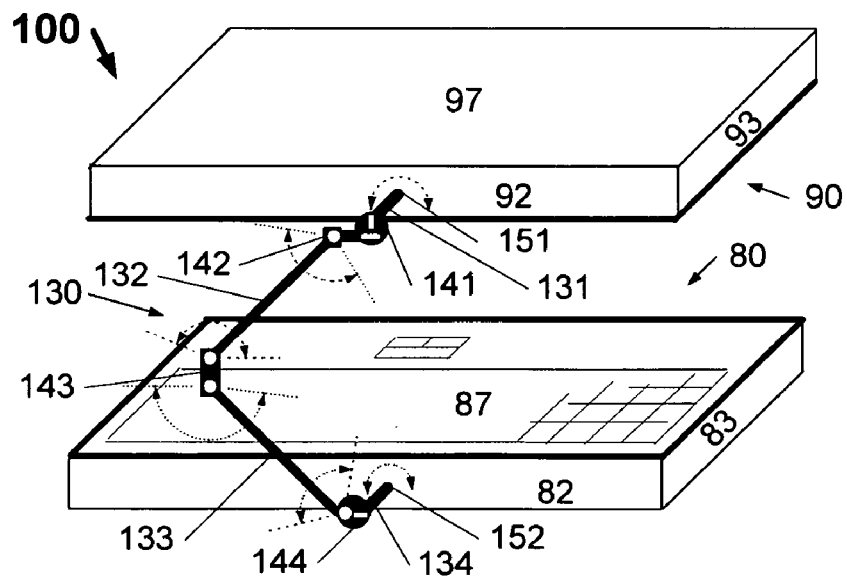

FIG. 6A is a perspective view of the first embodiment of the computer (100) of the present invention with a single back multi-sectioned arm, in a partially open position.

Figure 6B:
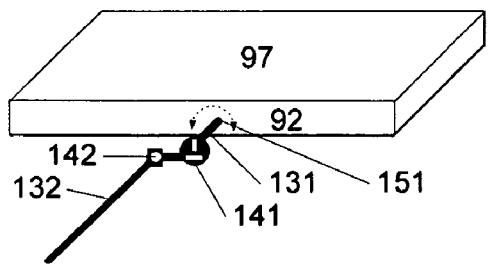

FIG. 6B is a split view of the top portion of the arm connected to the display of computer 100.

Figure 6C:
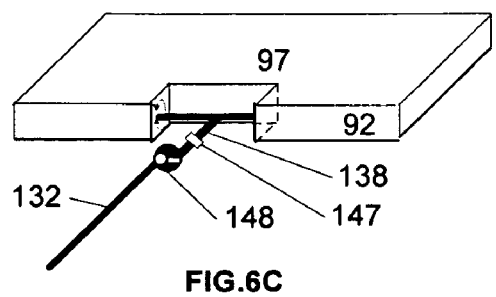

FIG. 6C is a possible substitute for the top portion of computer 100 as shown in FIG. 6B.

Figure 6D:
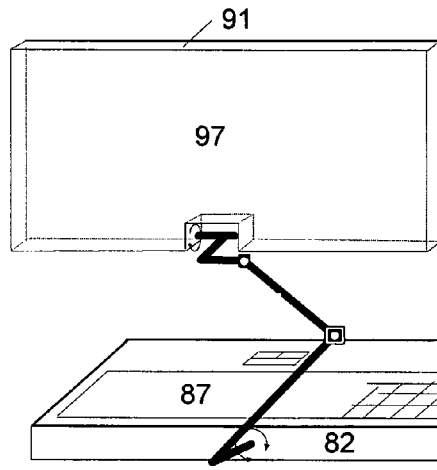

FIG. 6D is a simpler variation of a single arm portable computer of the present invention.

Figure 6E:
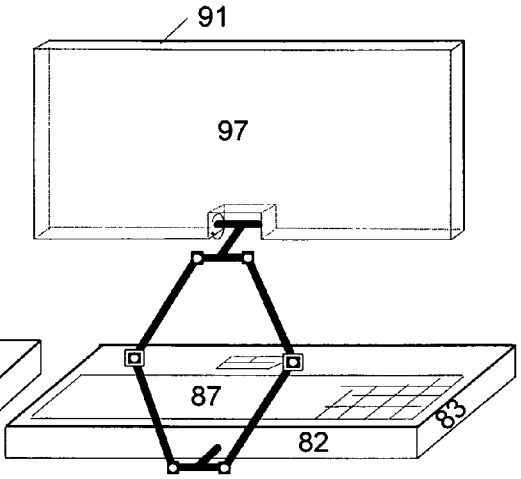

FIG. 6E is yet another variation by modifying the arm in FIG. 6D to enhance stability.

Figure 6F:
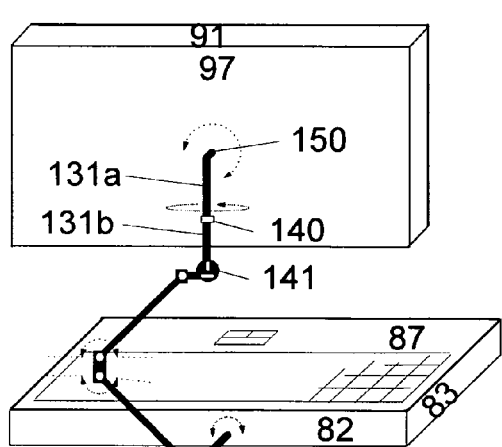

FIG. 6F is a variation of computer 100 to support both portrait and landscape orientations of the display.

Figure 6G:
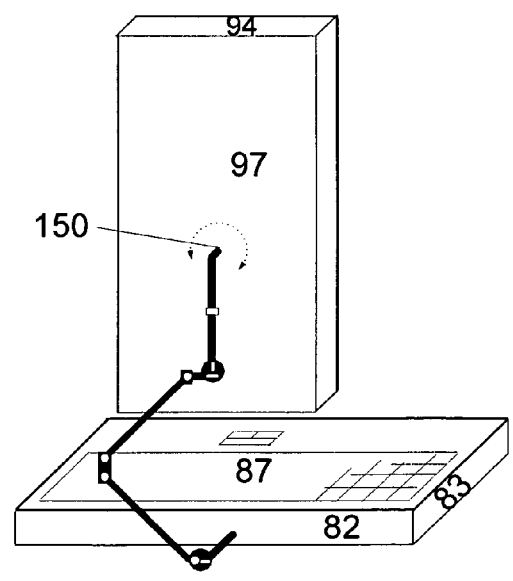

FIG. 6G is a perspective view of the computer in FIG. 6F when the display is set to the portrait orientation.

Figure 7:
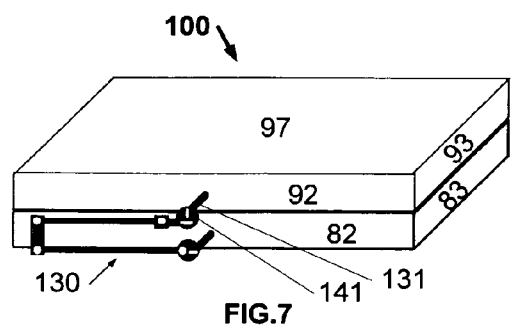

FIG. 7 is a perspective view of computer 100 in a closed position.

Figure 8:
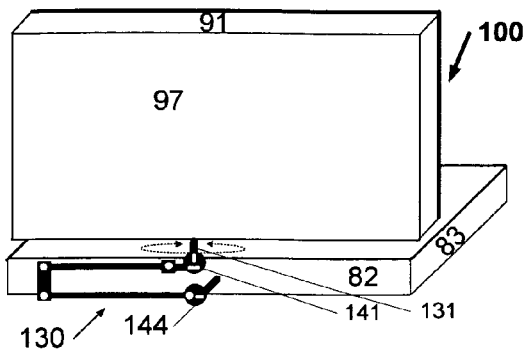

FIG. 8 is a perspective view of computer 100 in a conventionally opened screen-up position, with the folded arm placed next to the base's right back edge 82 (from the user's point of view).

Figure 9:
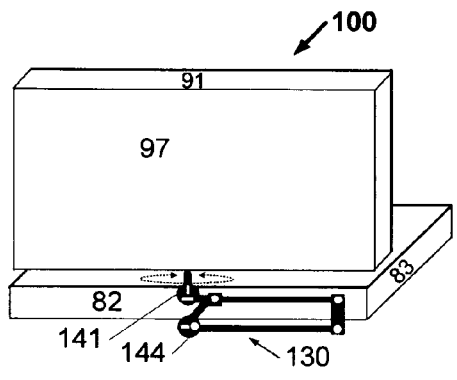

FIG. 9 is a perspective view of computer 100 in a conventionally opened, screen-up position, with the folded arm placed next to the base's left back edge 82 (from the user's point of view).

Figure 10:
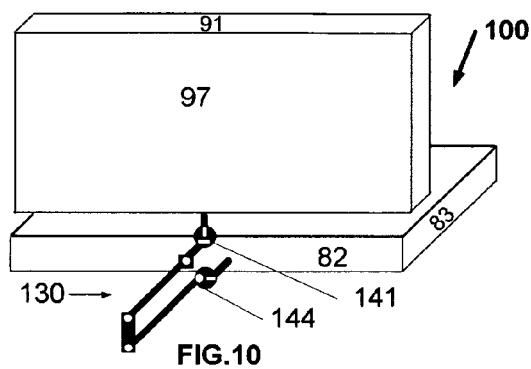

FIG. 10 is a perspective view of computer 100 in a conventionally opened, screen-up position, with the folded arm placed away from the base's back edge 82.

Figure 11:
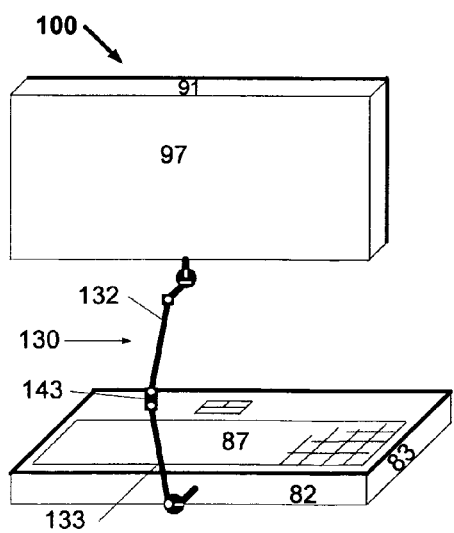

FIG. 11 is a perspective view of computer 100 in a position where the display is up-lifted, screen facing the user, and the arm being away from the back edge 82 of the base.

Figure 12:
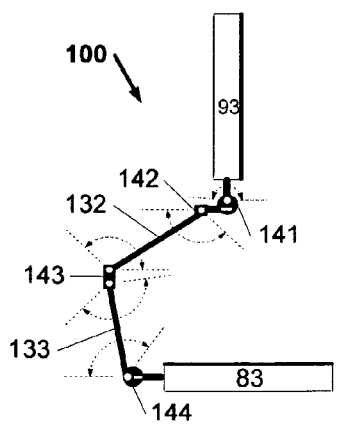

FIG. 12 is a perspective left side view of computer 100 in an opened, screen-up position, where the screen is away from its conventional vertical position towards the user.

FIG. 13 is a perspective view of computer 100 in an opened, screen-up position, where arm sections 132 and 133 are positioned near the back edge 82 of the base.

FIG. 14 is a perspective view of computer 100 in an opened, screen-up and backward facing position, where arm sections 132 and 133 are positioned near the back edge 82 of the base.

FIG. 15 is a perspective view of computer 100 in a closed position with viewing screen 98 facing upward (for the tablet PC configuration).

FIG. 16 is a perspective view of computer 100 in an open position in which the viewing screen 98 is facing the front, and the whole display is lifted and positioned towards to the right edge of the user (suitable for view sharing.)

FIG. 17 is a perspective view of computer 100 in a closed position with the base sitting on top of the display (for the space-saving configuration).

Second Embodiment

Figure 18A:
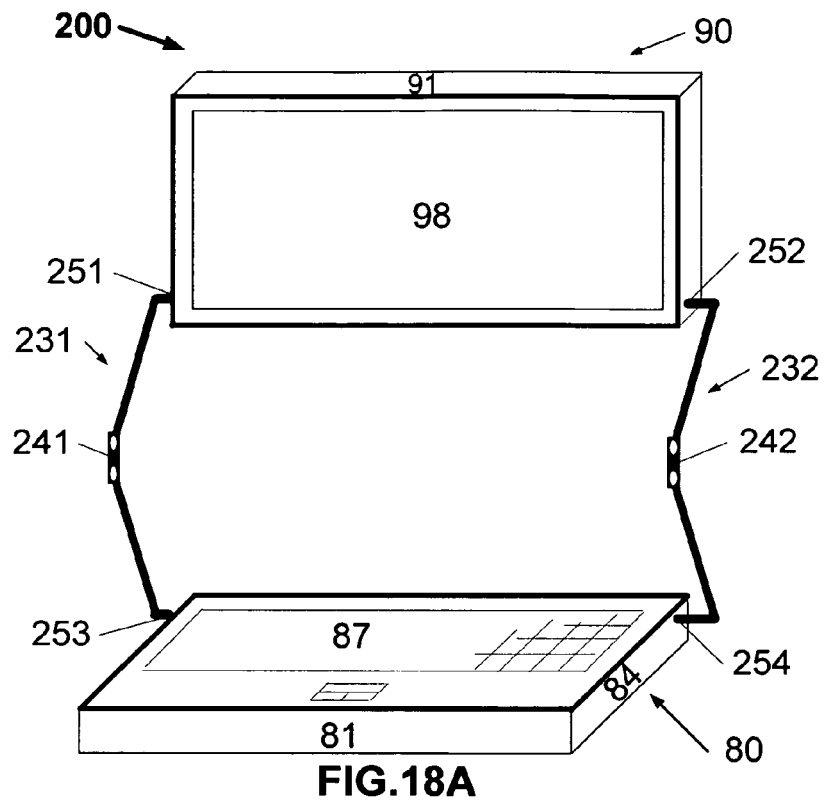

FIG. 18A is a perspective view of the portable computer (200) of the second embodiment of the present invention with two double-sectioned side arms. It is in a position where the screen is lifted and facing the user.

Figure 18B:
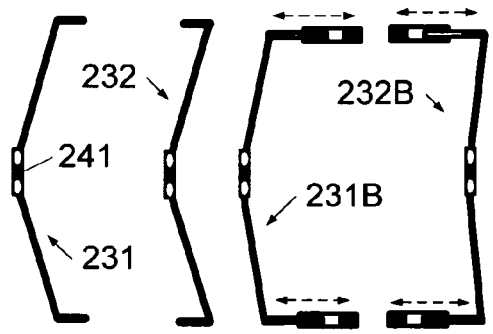

FIG. 18B shows that the pair of arms 231 and 232 in computer 200 can be substituted by another pair of arms 231B and 232B.

Figure 18C:
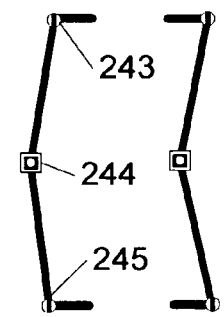

FIG. 18C shows that the pair of arms of computer 200 can also be substituted with yet another pair of arms.

Figure 19:
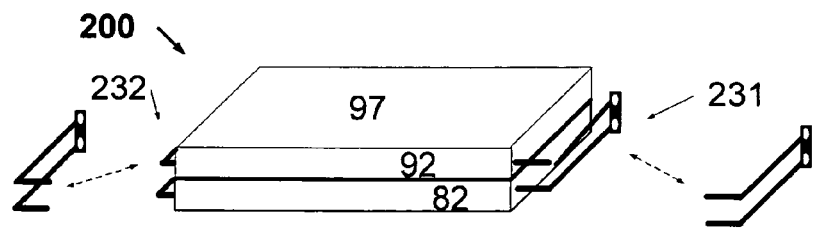

FIG. 19 is a perspective view of computer 200 in a closed, arms folded position. It also shows how the arms can be detached.

Figure 20A:
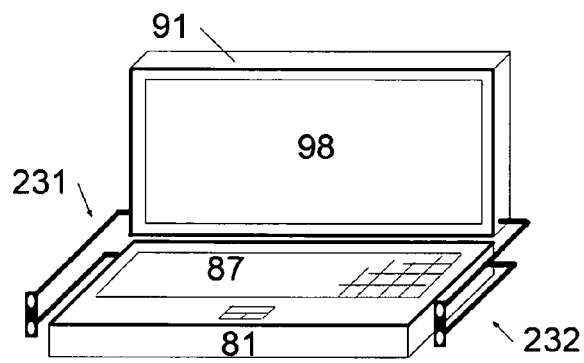

FIG. 20A is a perspective view of computer 200 in conventional open position.

Figure 20B:
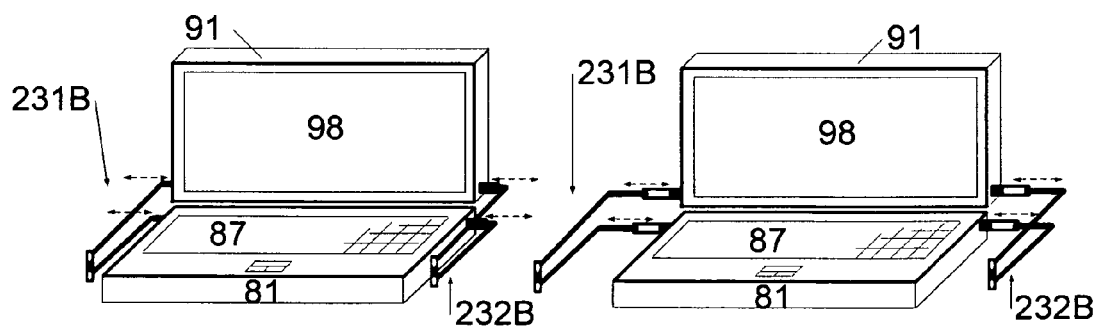

FIG. 20B shows a variation of computer 200.

Figure 21:
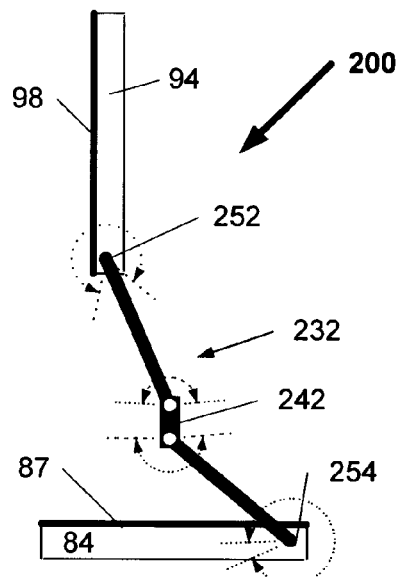

FIG. 21 is perspective side view of computer 200 in a position with the screen up-lifted and facing the user.

Figure 22:
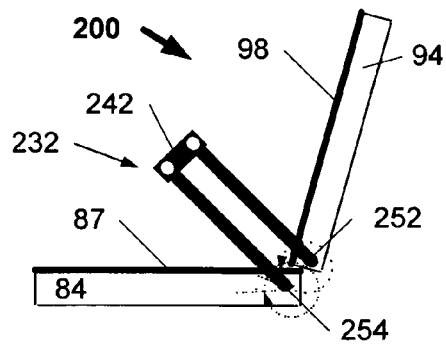

FIG. 22 is a perspective side view of computer 200 in a conventional open position with arms folded and lifted up to avoid blocking side edge 84 of the base for other uses such as a DVD player and other outlets.

Figure 23:
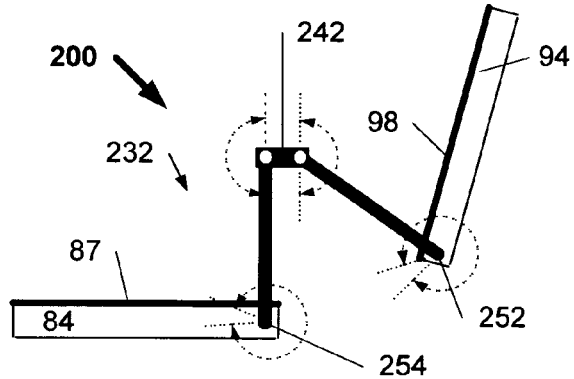

FIG. 23 is a perspective side view of computer 200 in an unconventional open position with arms partially stretched to reach behind the back edge of the base. (This is to show how flexible the display's viewing position can be.)

Figure 24:
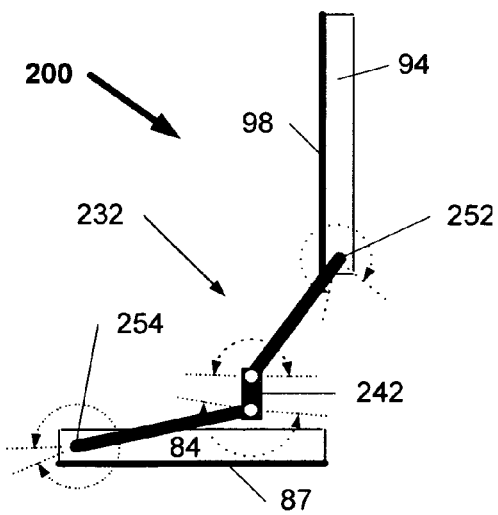

FIG. 24 is a perspective side view of computer 200 in an open position with display 90 up-lifted and the keyboard faced down (for the stylus configuration (4)).

Figure 25:
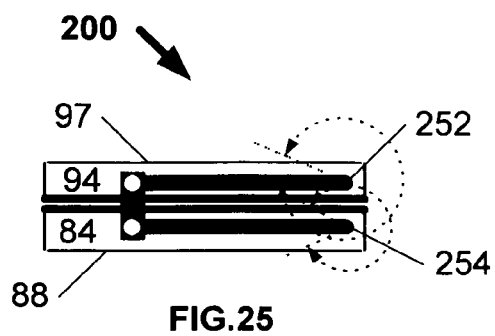

FIG. 25 is a perspective side view of computer 200 in a conventional closed position with arms folded and screen facing the keyboard.

Figure 26:
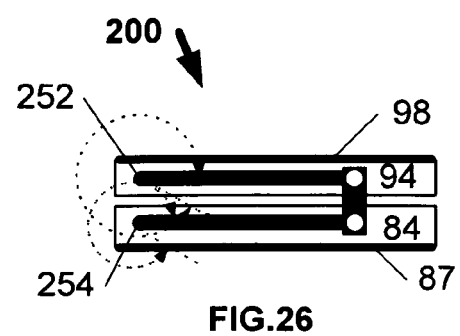

FIG. 26 is a perspective side view of computer 200 in a closed position with arms folded, screen facing up, and the base stacked underneath the display. (This is a Version of the Tablet PC Configuration.)

Figure 27:
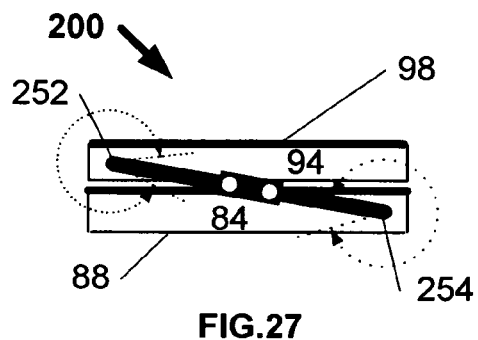

FIG. 27 is a perspective side view of computer 200 in a closed position with arms folded and screen facing up. (This is an alternative design to support the tablet PC configuration. In this special design, the length of arm 232 can not exceed the length of side edge 84.)

Third Embodiment

Figure 28A:
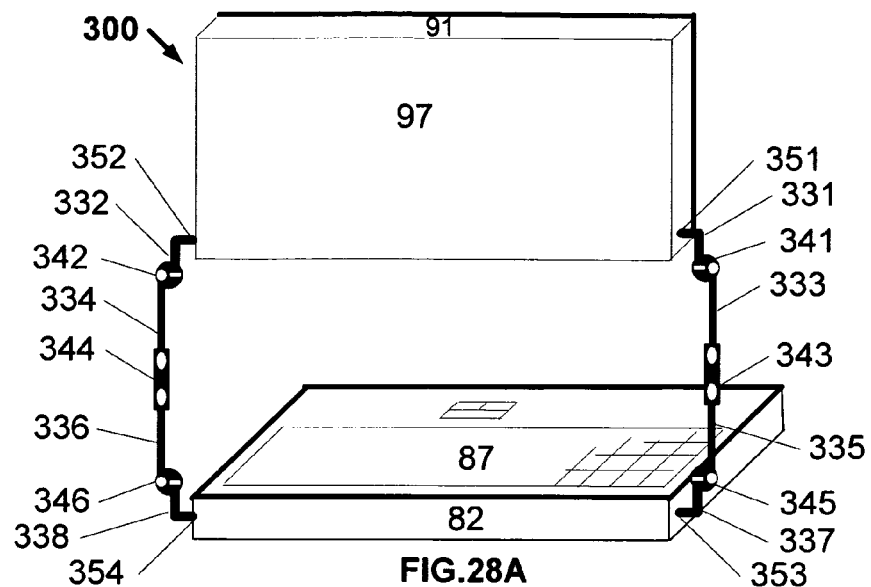

FIG. 28A is a perspective view of a portable computer (300) of the third embodiment of the present invention.

Figure 28B:
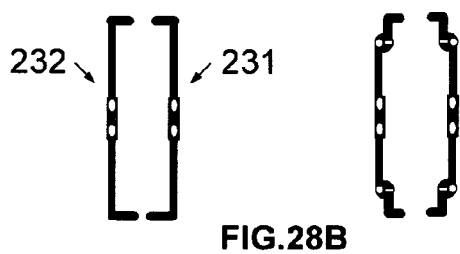

FIG. 28B is a split view of arms 231 and 232 of computer 200 and an alternative pair of arms. Substituting the arms leads to the third embodiment of the present invention as shown in FIG. 28A.

Figures 29, 30:
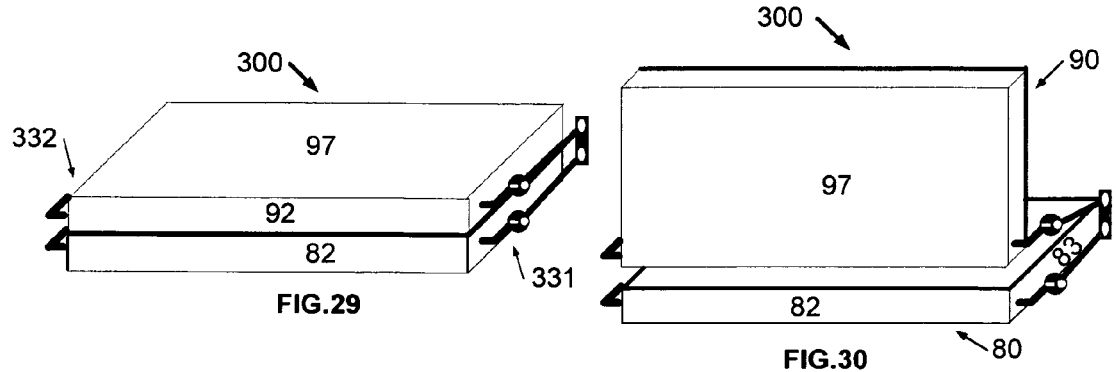

FIG. 29 is a perspective view of portable computer 300 in a closed position, with the arms folded.

FIG. 30 is a perspective view of portable computer 300 in a conventional open position, with arms folded and parked alongside the edges of the base (80).

Figure 31:
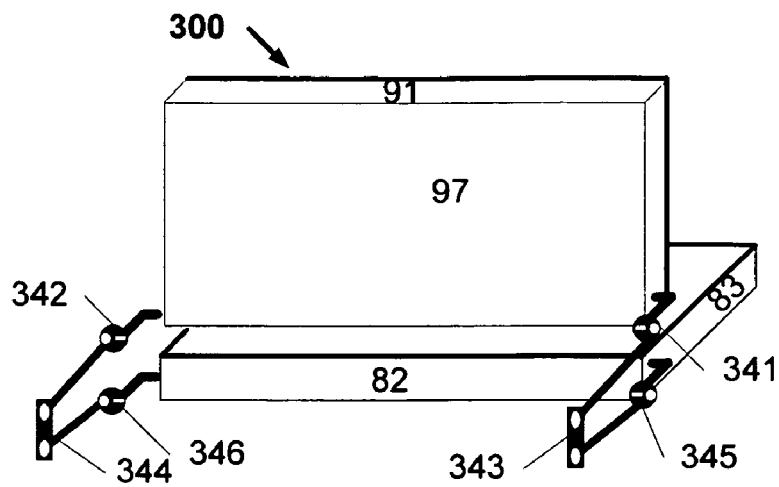

FIG. 31 is a perspective view of portable computer 300 in an open position, with arms folded and reached out from the back of the computer.

Figure 32:
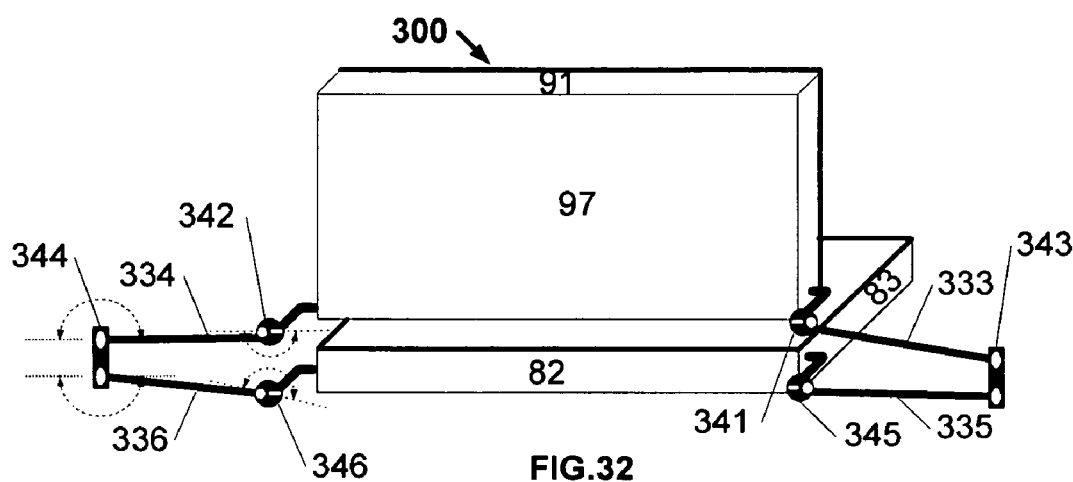

FIG. 32 is a perspective view of portable computer 300 in an open position, with arms folded, reached out first from the back of the computer, and then turned sideway away from the computer.

Figure 33:
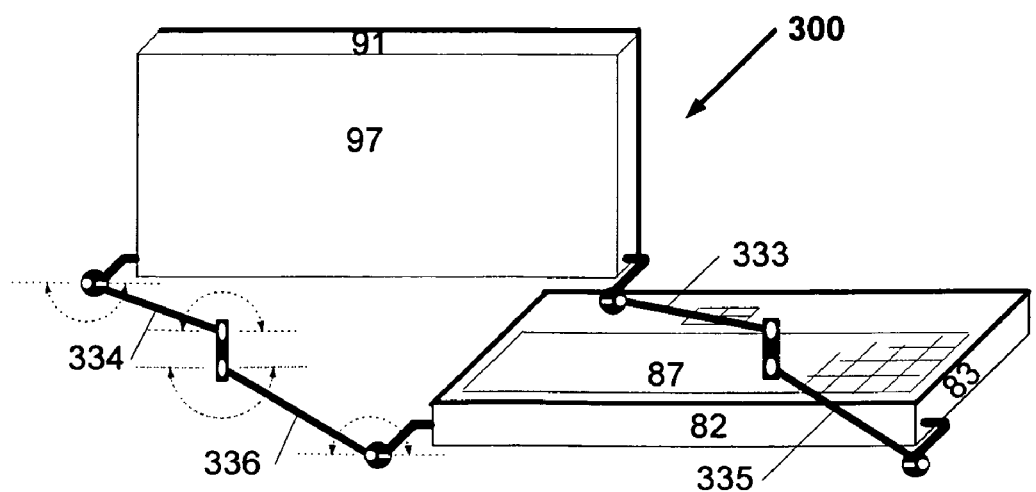

FIG. 33 is a perspective view of portable computer 300 in an open position, with arms partially stretched, and with the display partially up-lifted and reached out towards the right hand side of the computer (from the user's point of view.)

Fourth Embodiment

Figure 34A:
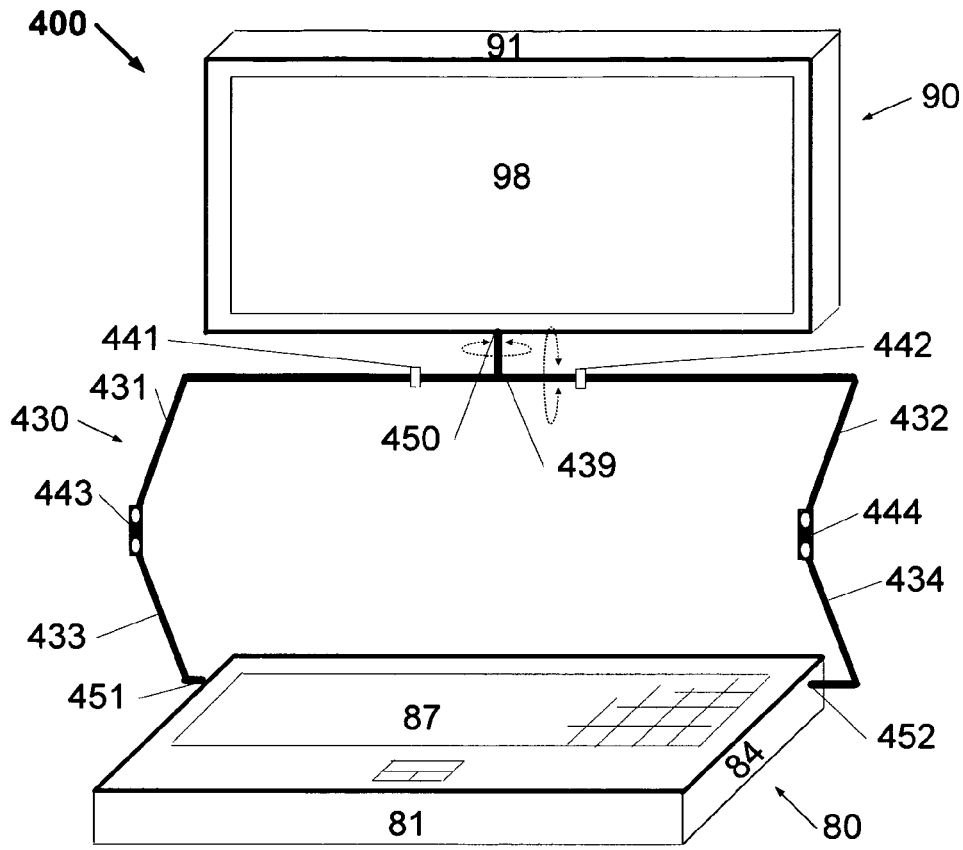

FIG. 34A is a perspective view of the portable computer (400) of the fourth embodiment of the present invention. This embodiment has one multi-sectioned bridge arm. It is in a position where the screen is lifted and facing the user.

Figure 34B:
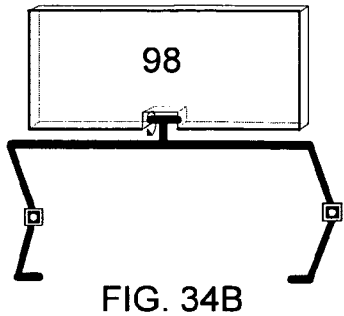

FIG. 34B shows is a partial view of a variation that replaces the display and the bridge arm of computer 400.

Figure 34C:
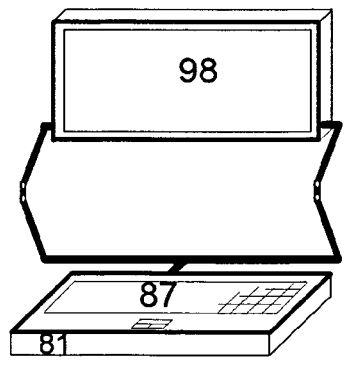

FIG. 34C shows a variation of computer 400. In the variation, the bridge arm connects to the back edge of the base and to the left and right edges of the display.

FIG. 35 is a perspective view of computer 400 in the conventional open position.

FIG. 36 is a perspective view of computer 400 in the conventional closed position.

FIG. 37 is a perspective view of computer 400 in an open position with the arm folded and the screen facing away from the user.

FIG. 38 is a perspective view of computer 400 in a closed position with screen facing upward.

FIG. 39 is a perspective view of computer 400 when the arm is completely detached from base 80 and display 90.

Fifth Embodiment

Figure 40A:
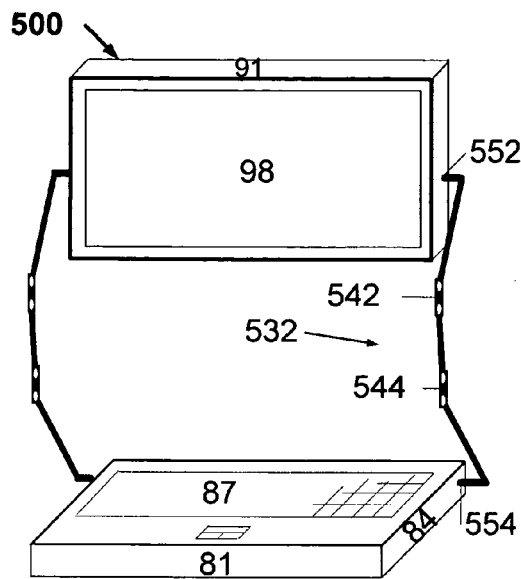

FIG. 40A is perspective view of the portable computer (500) of the fifth embodiment of the present invention. This embodiment has two triple-sectioned side arms. It is in a position where the screen is lifted and facing the user.

Figure 40B:
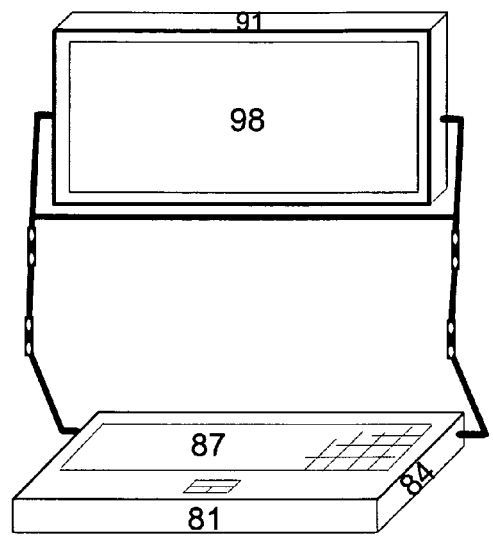

FIG. 40B shows a variation by adding a horizontal section that connects the left and the right arms in computer 500.

Figure 41A:
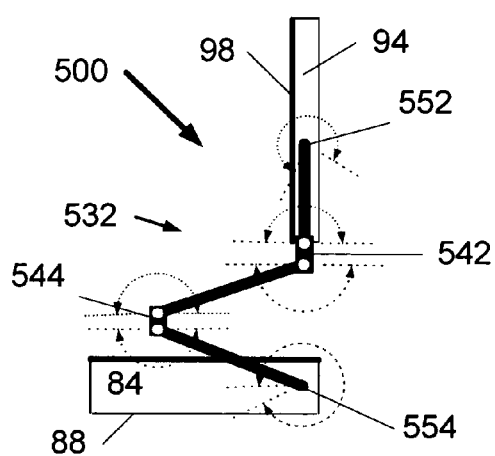

FIG. 41A is a perspective side view of computer 500.

Figure 41B:
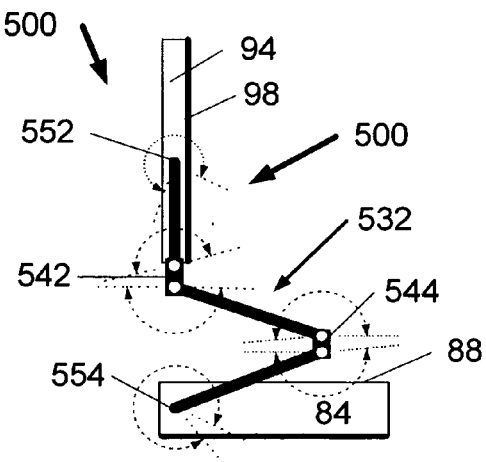

FIG. 41B is a perspective side view of computer 500 in a position where the screen is lifted and facing the user, and the keyboard is facing down. (This is for the stylus input configuration.)

Figure 42:
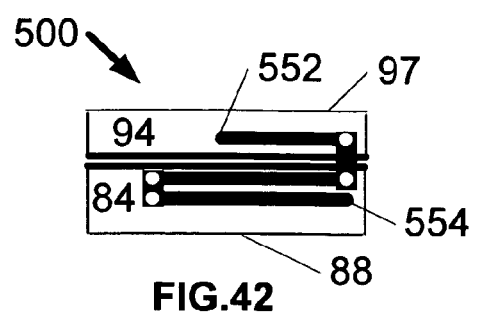

FIG. 42 is a perspective side view of computer 500 in a conventional closed position with arms folded.

Figure 43:
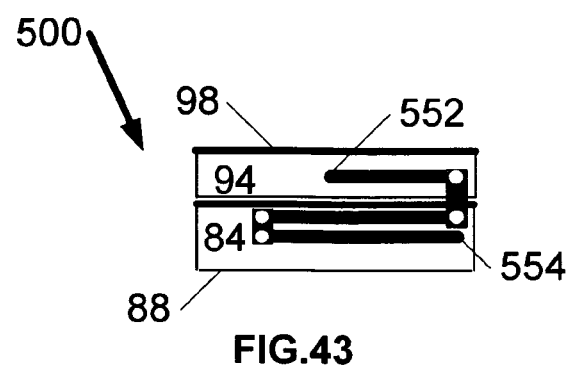

FIG. 43 is a perspective side view of computer 500 in a closed position with arms folded and screen facing up (for the tablet PC configuration).

Figure 44:
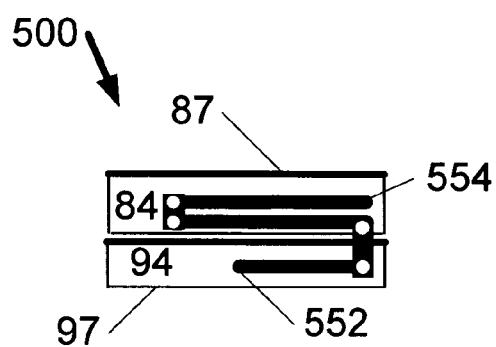

FIG. 44 is a perspective side view of computer 500 in a closed position with arms folded, base sitting on top of the display, and keyboard facing up (for space saving when the portable computer is used as a desktop machine).

Basic Mechanical Mechanisms to Implement the Design Notations

FIG. 45 presents a groove and locking tip mechanism.

FIG. 46 shows some ways in which two arm sections can be rotatably engaged together, either by direct engagement or by engagements with other intermediate parts. (For convenience, we also refer to such an engagement as "rotatably linked together".)

FIG. 47 shows an embodiment of a friction joint (5000) of the present invention.

FIG. 48 shows a friction joint (5000A), which a variation of friction joint 5000.

FIG. 49 shows a friction joint (5000B), which is another variation of friction joint 5000.

FIG. 50 shows an embodiment of a friction joint (5100) of the present invention.

FIG. 51 shows an embodiment of a friction joint (5300) of the present invention

FIG. 52 shows an embodiment of a friction joint mechanism (5400) of the present invention. Such a mechanism can be built into the ends of a multi-sectioned arm for pivotally mounting the arm to the base or the display of a portable computer (for example, computer 5200 in FIG. 62).

FIG. 53 shows an embodiment of a friction joint (5500) of the present invention.

FIG. 54 shows an embodiment of a friction joint (5600) of the present invention.

FIG. 55 shows an embodiment of a friction joint (5700) of the present invention.

Figure 56:
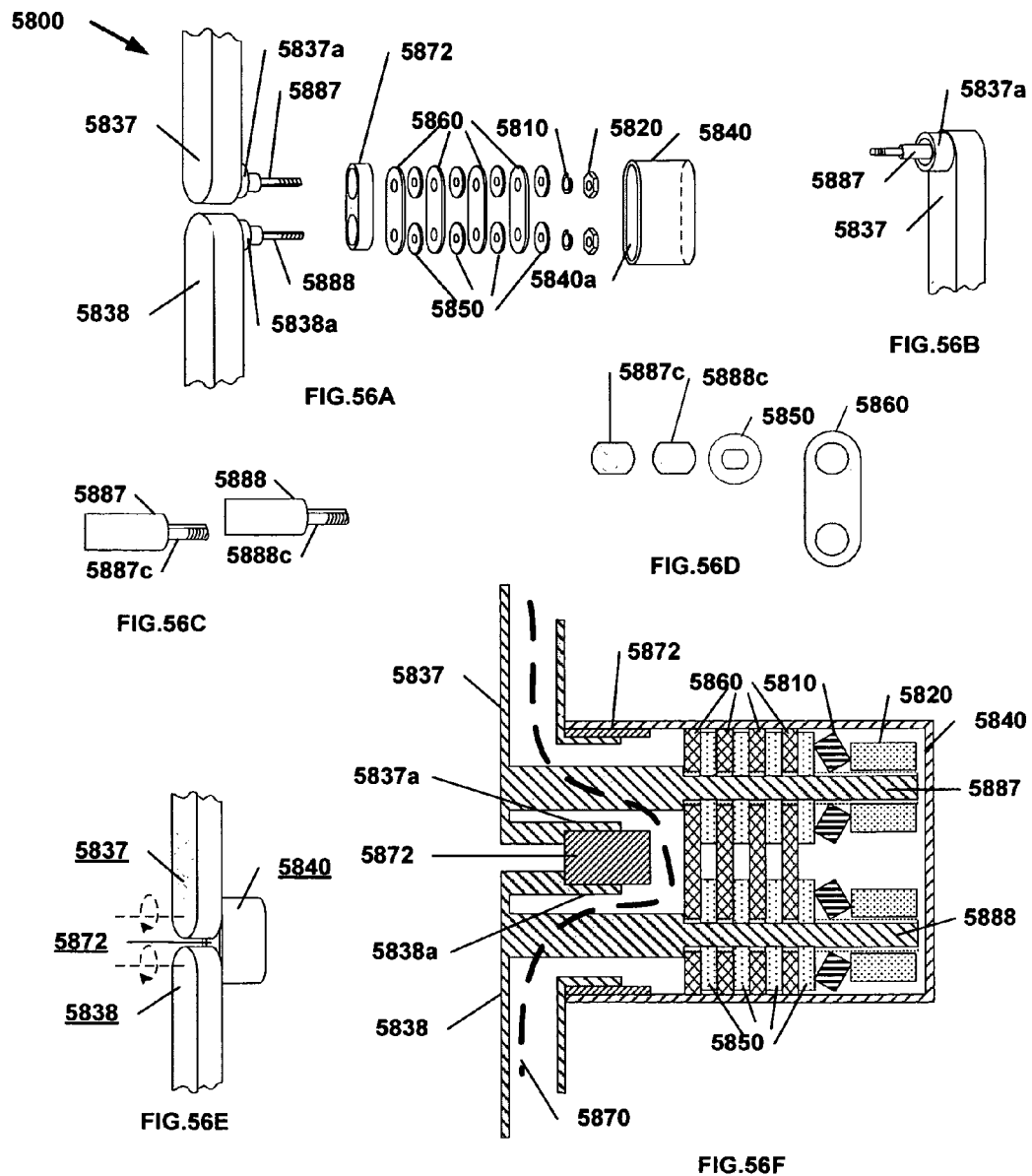

FIG. 56 shows an embodiment of a friction joint (5800) of the present invention.

FIG. 57 shows an embodiment of a friction joint (5900) of the present invention.

FIG. 58 shows some ways in which arm sections directly linked to friction joint 5000 can be extended.

FIG. 59 shows some ways in which mechanical joints 5000 and 5100 can be combined to create combo joints.

FIG. 60 presents a method for assembling multi-sectioned arms with embedded wiring cable when the cable used is pre-connected with connectors at the ends.

FIG. 61 shows how to attach a multi-sectioned arm to the base or the display of the portable computer of the present invention. This is a mechanical implementation of the notation in FIG. 3A-FIG. 3D.

Putting it all Together

Figures 62, 62A:
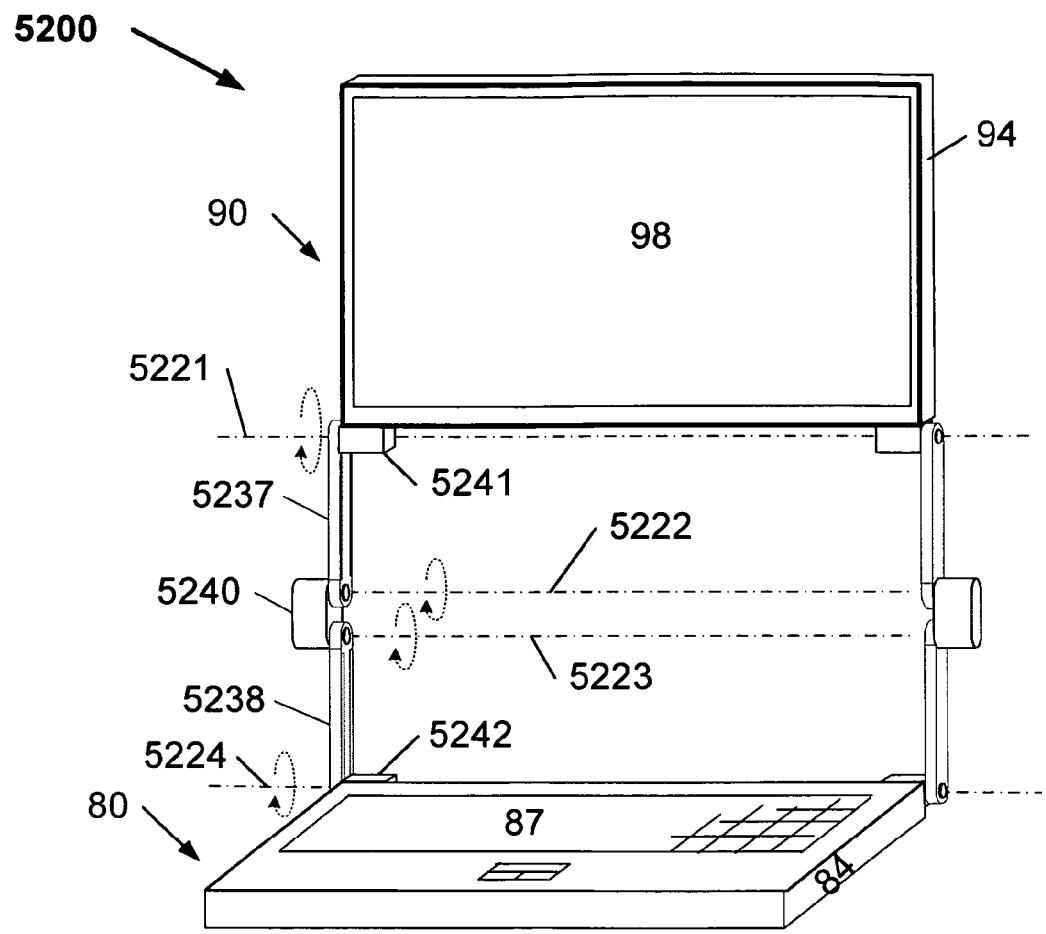

FIG. 62 shows a portable computer (5200). This is a mechanical implementation of the second embodiment of the portable computer (200) of the present invention with two double-sectioned side arms.

DETAILED DESCRIPTION OF THE PREFERRED AND ALTERNATIVE EMBODIMENTS

Drawing Notations

For convenience in the drawings of the embodiments of the computer according to the present invention, FIG. 1-FIG. 3 list some notations as short hands to represent arm sections, their linkage and relative movements, and their connections to the base and the display. It should be pointed out that only those used directly in the drawings are listed for illustration purpose, and that they do not represent all the possibilities enabled by the present invention.

FIG. 2 is a list of notations used in the drawings to show the relative movements of the arm sections that are linked together.

FIG. 2A denotes a joint which allows the two attached sections to rotate around the joint; and they rotate on two parallel planes.

FIG. 2B denotes a joint which allows the two attached sections to rotate around the same axis; and they rotate on the same plane.

FIG. 2C denotes a joint which allows the two attached sections to independently rotate around the joint on a common plane; and the sections will not overlap in a folded position. (The point of view dictates which one of the two pictures to use in the drawings.)

FIG. 2D denotes a joint which allows the two attached sections to turn in relatively opposite direction.

FIG. 2E is perspective view of a combination of two joints and three arm sections. The purpose is to show how simple joints can be combined to allow more flexible rotations of the end sections. Around joint 841, arm section 831 can rotate in any selected plane; and the selected plane can change when arm section 832 turns (relative to arm section 833) around joint 842. If we look at the combination as a whole, the end sections 831 and 833 can turn independently on separate planes. That is, even when arm section 833 stays still, arm section 831 can turn on its own on a selected plane; and furthermore, this selected plane can change even when section 833 does not move. (In engineering implementation, if the middle section 832 is short, it may help to think of such a joint combination as just one combo-joint mechanism which allows the two attached end sections 831 and 833 to rotate independently. Therefore, we also have the notation of FIG. 2F.

FIG. 2F denotes a joint which allows the two attached sections to rotate independently around two separate axes, and they rotate on two separate planes. There is more than one variation (two being shown here). The point of view dictates which variation to use in a drawing. In general, this type of joint is marked by a block circle containing two of the three symbols: a white vertical bar, a white horizontal bar, and a white circle, which are used to indicate the planes for the associated arm sections to rotate on. We generally use the white horizontal bar to indicate the associated arm section that can rotate on a plane parallel to the base of the portable computer. We use the white vertical bar to indicate the associated arm section that can rotate on a plane that is perpendicular to the base of the computer, and that the plane is invisible or reduced to a line from the perspective view point of the drawing. And we use the white circle to indicate the plane that is also perpendicular to the base of the computer, but the plane is at least partially visible from the perspective view point of the drawing. (This notation is somewhat analogous to the 3D coordinates. But it is not the same because the three planes here do not have to be perpendicular to one another. In engineering implementation, this type of joint can be substituted with a joint-combo such as FIG. 2E.)

FIG. 2G denotes a joint that allows arm section 835 to rotate around section 834.

FIG. 2H denotes two or more arm sections that are extendably and contractibly linked together to form a shortenable and elongatable arm portion. The doubled-headed arrow indicates the directions in which the linked sections can extend and contract. For convenience, these linked sections together are referred to as the extendable sections and also as the contractible sections. In engineering implementations, for example, such sections can be telescopically linked together; and they can also be slidably linked together.

FIG. 4A is a perspective view of the display of a portable computer in an upward position. Display 90 generally has two sides and four edges: viewing screen side 98, back side 97, upper edge 91, lower edge 92, left edge 93, and right edge 94 (from the user's normal view point).

FIG. 4B is a perspective view of the base of a portable computer. Base 80 preferably includes a central processing unit and other electronic components and a data entry member, such as a keyboard. Base 80 generally has two sides and four edges: upper side (keyboard) 87, bottom side 88, front or user edge 81, back edge 82, left edge 83, and right edge 84 (from the user's normal view point). The bottom side 88 can sometimes be used by an alternative data entry member, such as stylus input.

First Embodiment

FIGS. 6 to 17 show a portable computer (100) according to a first embodiment of the present invention. Computer 100 has one single back arm.

FIG. 6A is a perspective view of the portable computer (100) of the first embodiment of the present invention. This embodiment includes a display 90, a base 80, and a multi-sectioned arm 130. One end section 131 of the arm is connected to the display at pivot 151; and the other end section 134 is connected to the based at pivot 152. Pivot 151 allows the display to rotate relatively around arm section 131; and pivot 152 allows the base to rotate relatively to arm section 134. Consequently the portable computer can be arranged into various configurations by controlling how display 90 and base 80 face each other. (Alternatively, such configurations can be obtained by simply detaching the arms, setting up the display and the base to the desired configurations, and re-attaching the arms again.) Arm sections 132 and 133 can be adjusted independently around joint 143, as assisted by joint 142 and joint 144 (a function denoted as a white circle in the black circle), respectively. Together they allow the arm to control the continuous movement of pivot 151 (and thus the screen) within a selected plane. Besides, this selected plane can be changed continuously using a function of joint 141 (denoted as a horizontal white bar inside the black circle), together with its counterpart in joint 144. Therefore, the viewing screen's position can be adjusted continuously within a three dimensional space of semi-diameter equal to the total length of arm sections 132 and 133. The screen's viewing angle can be adjusted using the other function of joint 141 (denoted as a vertical white bar). There are locks to prevent the end sections 131 and 134 from unintentional detachment. There are also mechanisms to control how much the end sections of the arm can rotate at pivots 151 and 152, respectively.

FIG. 6B is the top portion the arm connected to the display of computer 100. This portion can be substituted by an alternative version as shown in FIG. 6C. One function of joint 141 (as in FIG. 6B) is to tilt the screen for different viewing angle; and this can be achieved by turning display 90 at the "T-shaped" arm section 138 (as in FIG. 6C). The ability for the display to turn around the end section 131 (as in FIG. 6B) can be achieved by turning the "T-shared" arm section at joint 147 (as in FIG. 6C). And the function of joint 142 in assisting the arm section 132 to turn (as in FIG. 6B) can be achieved by a function of joint 148 (denoted as a white circle in the black circle, as in FIG. 6C). And finally, one function of joint 141 as denoted by the horizontal white bar inside the black circle (as in FIG. 6B) can be achieved by the counterpart in joint 148 (as in FIG. 6C).

FIG. 6D is a simpler variation of a single arm portable computer of the present invention. This arm is functionally less flexible than the arm in computer 100. With this simpler arm, the display can move up and down, and left and right, relative to the base. Since our focus at this point is to discuss computer 100 (FIG. 6A), we shall skip the detailed discussion of this variation. FIG. 6E is yet another variation by modifying the arm in FIG. 6D to enhance stability.

FIG. 6F is a variation of computer 100. In this variation, 131 and connection pivot 151 in FIG. 6A are replaced by sections 131a and 131b, joint 140, and connection pivot 150 (on the back side of the display). Notice that joint 140 serves the role previously served by pivot 151, and that the location connection 150 on the back of the display allows the display to rotate between landscape and portrait orientations. FIG. 6G is a perspective back view when the screen is a portrait orientation.

FIG. 7 is a perspective view of computer 100 in a closed position. This position can be obtained by folding arm 130 in FIG. 6A.

FIG. 8 is a perspective view of computer 100 in a conventionally opened, screen-up position, with the folded arm placed next to the base's right back edge 82 (from the user's point of view). This position can be obtained by lifting the end section 131 around joint 141 in FIG. 7.

FIG. 9 is a perspective view of computer 100 in a conventionally opened, screen-up position, with the folded arm placed next to the base's left back edge 82 (from the user's point of view). This position can be obtained by swinging the arm sections simultaneously around 141 and 144 (using the functions denoted by the horizontal white bars inside the black circles) in FIG. 8

FIG. 10 is a perspective view of computer 100 in a conventionally opened, screen-up position, with the folded arm placed away from the base's back edge 82 (to avoid blocking the back edge 82 of the base for other uses, such as various cable outlets.) This position can be obtained by swinging the arm simultaneously using the functions denoted by the horizontal white bars in 141 and 144 in FIG. 8.

FIG. 11 is a perspective view of computer 100 in a position where the display is up-lifted, screen facing the user, and the arm being away from the back edge 82 of the base. This position can be obtained by opening up arm 130 in FIG. 10.

FIG. 12 is a perspective left side view of computer 100 in an opened, screen-up position, where the screen is away from its conventional vertical position towards the user. This position can be obtained by adjusting the rotation angles of 132 and 133 at joint 143 in FIG. 11.

FIG. 13 is a perspective view of computer 100 in an opened, screen-up position, where arm sections 132 and 133 are positioned near the back edge 82 of the base. This position can be obtained by lifting the end section 131 around joint 141 in FIG. 6A.

FIG. 14 is a perspective view of computer 100 in an opened, screen-up and backward facing position, where arm sections 132 and 133 are positioned near the back edge 82 of the base. This position can be obtained from FIG. 8 by turning the screen to the back.

FIG. 15 is a perspective view of computer 100 in a closed position with viewing screen 98 facing upward (for the tablet PC configuration). This position can be obtained by closing down the display from FIG. 14.

FIG. 16 is a perspective view of computer 100 in an open position in which the viewing screen 98 is facing the front, and the whole display is lifted and positioned towards to the right side of the user (suitable for view sharing.) This position can be obtained by moving display 90 towards the right side (relative to the user) as shown in FIG. 13.

FIG. 17 is a perspective view of computer 100 in a closed position with the base sitting on top of the display (for the space-saving configuration). This position can be obtained from FIG. 13 in the following steps: Rotate base 80 around arm section 134 (connected at pivot 152) to let the keyboard face down; close the computer; and turn the computer downside-up.

Second Embodiment

FIGS. 18 to 27 show a portable computer (200) of a second embodiment of the present invention. Computer 200 has two double-sectioned side arms.

FIG. 18A is a perspective view of the portable computer (200) of the second embodiment of the invention. The computer has two double-sectioned side arms. It is in a position where the screen is lifted and facing the user. The portable computer 200 generally includes a display 90, a base 80, and two double-sectioned side arms 231 and 232. The left arm 231 is connected to the display at pivot 251, and to the base at pivot 253. The right arm 232 is connected to the display at pivot 252, and to the base at pivot 254. The viewing angle of the screen can be adjusted by rotating the display around pivot 251 and pivot 252. The double-sectioned arms can be adjusted synchronously through joints 241 and 242, thus allowing continuous adjustment of the display's position by height and depth (see Configuration (1) in the Background section). The range of adjustment can be as far as the length of the fully stretched arms. The portable computer can be arranged into various configurations by setting how the screen 98 and the keyboard 87 face each other; and this can be achieved by turning the base and display around the connection pivots (at 251, 252, 253, and 254). There are locks to prevent the arms from unintentional detachment from the base and the display. There are also mechanisms to control how much the end sections of the arm can turn at pivots 251, 252, 253, and 254.

FIG. 18B shows that the pair of arms (231 and 232) in computer 200 can be substituted by another pair of arms (231B and 232B). Both 231B and 232B have extendable sections at their ends.

FIG. 18C shows that the pair of arms of computer 200 can also be substituted with yet another pair of arms.

FIG. 19 is a perspective view of computer 200 in a closed, arms folded position. It also shows how the arms can be detached. This position can be obtained by turning the screen face down and then folding the arms.

FIG. 20A is a perspective view of computer 200 in conventional open position.

FIG. 20B is a variation of computer 200. The arms (231B and 232B) have extendable sections at their ends. The extendable sections allow each of the folded arms to adjust its distance from the edges of the base and the display. This added feature of the arms is useful in certain situations. For example, an external network card (for wired and wireless networking alike) of many of today's brands often leaves a big portion of the card's body outside of the insertion slot; and the un-inserted portion of the card may interfere with the folded arm parked by the edge of the base if the arm is too close to the edge.

FIG. 21 is perspective side view of computer 200 in a position with the screen up-lifted and facing the user. It shows how the upper and lower sections of arm 232 can turn independently around joint 242. It also shows how the display can rotate around arm at 252 and how the arm can turn relatively around the base at 254. (The left arm is not shown in this view.) These mechanisms allow the portable computer to transition from its current position to any of the configurations as shown in FIG. 24-FIG. 26.

FIG. 22 is a perspective side view of computer 200 in a conventional open position with arms folded and lifted up to avoid blocking the edge 84 of the base for other uses (such as a DVD player).

FIG. 23 is a perspective side view of computer 200 in an unconventional open position with arms partially stretched to reach behind the back edge of the base. (This is to show how flexible the display's viewing position can be.)

FIG. 24 is a perspective side view of computer 200 in an open position with display 90 up-lifted and the keyboard faced down (for the stylus configuration (4)). This position can be obtained from FIG. 21 by two steps: turn the base around pivot 254 to a face-down position; and then adjust 232.

FIG. 25 is a perspective side view of computer 200 in a conventional closed position with arms folded and screen facing the keyboard.

FIG. 26 is a perspective side view of computer 200 in a closed position with arms folded, screen facing up, and the base stacked underneath the display. (This is for the tablet PC configuration.) This position can be obtained from FIG. 21 in the following steps: Flip the base to make the keyboard face down (by rotating the base around pivot 254); fold the arm towards the right hand side in FIG. 21 (i.e. in the opposite direction to how the arm is normally opened and closed in the notebook configuration); and close down display (with screen facing up).

FIG. 27 is a perspective side view of computer 200 in a closed position with arms folded and screen facing up. (This is an alternative design to support the tablet PC configuration. In this special design, the length of the arm 232 should not exceed the length of side edge 84.)

Third Embodiment

FIGS. 28 to 33 show a portable computer (300) of a third embodiment of the present invention. The third embodiment is an enhancement of the second embodiment by substituting the side arms in computer 200 with an enhanced pair of arms, in order to allow the display to move left or right relative to the base.

FIG. 28A is a perspective view of a portable computer (300) of the third embodiment of the present invention. The third embodiment is an extension of the second embodiment by substituting the side arms (231 and 232) in computer 200 with a different pair of arms as shown in FIG. 28B. Each of these new arms has two additional combo-joints 341 and 345 (also 342 and 346 on the other arm). The additional joints allow the middle sections of the arms to swing away from the side edges of the computer (300), and consequently enabling the display to move sideway, as shown in FIG. 33. This swinging movement uses the functions of the joints denoted by white horizontal bars inside the black circles (joints 341, 345, 342, and 346). And the white circles inside the black circles are for cooperation with middle joints 343 and 344 in folding and stretching of the long sections (333, 335, 334, and 336). In addition to sideway movement for the display (or adjustment by width as specified in Configuration (2) of the Background Section), computer 300 of the third embodiment retains all the allowable positions and configurations of computer 200 of the second embodiment.

FIG. 28B is a split view of arms 231 and 232 of computer 200 (as shown in FIG. 18A) and an alternative pair of arms. Substituting the arms leads to the third embodiment of the present invention as shown in FIG. 28A.

FIG. 29 is a perspective side view of portable computer 300 in a closed position, with the arms folded.

FIG. 30 is a perspective view of portable computer 300 in a conventional open position, with arms folded and parked alongside the edges of the base (80).

FIG. 31 is a perspective view of portable computer 300 in an open position, with arms folded and reached out from the back of the computer. This position can be obtained from FIG. 28A by folding the arms (around joints 343 and 344) in the opposite direction from the way they are normally folded when the computer is in a conventional close position as shown in FIG. 29.

FIG. 32 is a perspective view of portable computer 300 in an open position, with arms folded, reached out first from the back of the computer, and then turned sideway away from the computer. This position can be obtained from FIG. 31 by turning the middle sections 333 and 335 around joints 341 and 345 on one arm, respectively (and also sections 334 and 334 around joints 342 and 346 on the other arm, respectively). This position places the sections 333 and 335, and 334 and 336 all on the same plane. This is a preparation for the position in FIG. 33.

FIG. 33 is a perspective view of portable computer 300 in an open position, with arms partially stretched, and with the display partially up-lifted and reached out towards the right hand side of the computer (from the user's point of view.) This position can be obtained from FIG. 32 by moving the arms sections simultaneously, 333 and 345 on one arm, and 344 and 346 on the other; and this simultaneous movement is possible when these four arm sections are on the same plane, a condition set up in FIG. 32.

Fourth Embodiment

FIG. 34-FIG. 39 show a portable computer (400) according to a fourth embodiment of the present invention. Computer 400 has a bridge arm.

FIG. 34A is a perspective view of the portable computer (400) of the fourth embodiment of the present invention. This embodiment has one multi-sectioned bridge arm. It is in a position where the screen is lifted and facing the user. The portable computer 400 generally includes a display 90, a base 80, and a multi-sectioned bridge arm 430. The bridge arm sections 433 and 434 are attached to the based at pivots 451 and 452, respectively; and the middle section 439 is connected to the display at pivot 450. The viewing angle of the screen can be tilted by turning arm section 439 relatively to joints 441 and 442. The screen can rotate around pivot 450. Upper side arm sections 431 and 432 (similarly lower side arm sections 433 and 434) are adjustable synchronously. Adjusting the side arm sections allows continuous adjustment of the display's position by height and depth (Configuration (1) of the Background Section). The range of adjustment is limited by the length the side arm sections. The portable computer can be arranged into various configurations by setting how the screen 98 and the keyboard 87 face each other. There are locks to prevent the arms from unintentional detachment from the base and the display. (FIG. 39 shows how the arm can be completely detached from the base and the display.) There are also mechanisms to control how much the end section of the arm can turn at pivots 450, 451 and 452.

FIG. 34B is a partial view of a variation that replaces the display and the bridge arm of computer 400.

FIG. 34C shows a variation of computer 400. In the variation, the bridge arm connects to the back edge of the base and to the left and right edges of the display.

FIG. 35 is a perspective view of computer 400 in the conventional open position.

FIG. 36 is a perspective view of computer 400 in the conventional closed position.

FIG. 37 is a perspective view of computer 400 in an open position with the arm folded and the screen facing away from the user. This position can be obtained from FIG. 35 by turning the display around the attached arm section at pivot 450.

FIG. 38 is a perspective view of computer 400 in a closed position with screen facing upward. This position can be obtained from FIG. 37 by closing down the display.

FIG. 39 is a perspective view of computer 400 when the arm is completely detached from base 80 and display 90. (For example, one possible way to make this bridge arm detachable from the base in this case is to use extendable sections (see FIG. 2H) at the ends that connect to the base.

Fifth Embodiment

FIG. 40 to FIG. 44 show a portable computer (500) according to a fifth embodiment of the present invention. Computer 500 is an enhancement of computer 200 by adding an additional section to each of the two side arms. The purpose is to show that it is possible to have side arms with more than two sections.

FIG. 40A is a perspective view of computer (500) having two triple-sectioned side arms. It is in a position where the screen is lifted and facing the user. The portable computer generally includes a display 90, a base 80, and two triple-sectioned side arms attached to base and the display on their left and right sides. The adjustability of the display and the allowable configurations of this portable computer are similar to those of portable computer 200. FIG. 41A shows how the arm sections, joints, and pivots can be adjusted. It allows the portable computer to transition from its current position to a variety of the positions shown in FIG. 41B-FIG. 44.

FIG. 40B shows a variation by adding a horizontal section that connects the left and the right arms in computer 500. This turns the two separate arms into a single bridge arm that connects the left and right edges of the base and the display. In practical application, this added horizontal section may enhance the stability of arm structure.

FIG. 41A is a perspective side view of computer (500).

FIG. 41B is a perspective side view of computer 500 in a position where the screen is lifted and facing the user; and the keyboard is facing down. (This is for the stylus input configuration.) This position can be obtained from FIG. 41A by the following steps: turn the base around pivot 554; stretch the lower two sections of arm and then partially fold them back in the opposite direction around joint 544; turn the display around pivot 552.

FIG. 42 is a perspective side view of computer 500 in a conventional closed position with arms folded.

FIG. 43 is a perspective side view of computer 500 in a closed position with arms folded and screen facing up (for the tablet PC configuration).

FIG. 44 is a perspective side view of computer 500 in a closed position with arms folded, base sitting on top of the display, and keyboard facing up (for space saving when the portable computer is used as a desktop machine). Notice that up to this point, we have presented embodiments as well as variations of the portable computer of the present invention with arms that have various numbers of arm sections and that connect to a number of combinations of the edges and sides of the base and the display. It should become obvious that other embodiments with arms designed in such ways to connect to other combinations of edges and sides of the display and the base can easily be worked out. Therefore, there is no need to enumerate more variations.

Locking Mechanisms and Rotatable Connections

FIG. 45 presents a groove and locking tip mechanism for preventing two rotatably linked sections from detaching and for limiting the relative rotation of the two linked sections within a pre-determined range.

FIG. 45A presents a C-shaped groove and locking tip mechanism 1200. The outer surface of cylinder 1211 has a C-shaped groove 1291. The inner surface of cylinder 1212 has a tip 1292. The diameter of the cylinder 1211 is slightly smaller than the inner diameter of cylinder 1212, so that 1211 can be inserted into 1212. When 1211 is fully inserted into 1212, tip 1292 is engaged with groove 1291. Tip 1292 only yields to pressure from the back, and therefore allows the insertion of cylinder 1211 into cylinder 1212. Tip 1292 does not yield to pressure from other directions. Therefore, groove 1291 and tip 1292 together provide two functions: (1) to prevent cylinder 1211 from backing out of cylinder 1212, as shown in FIG. 45B, and (2) to limit the rotation of 1211 within 1212 in a pre-determined range, as shown in FIG. 45C. The tip 1292 and groove 1291 can be implemented in manner known per se by a person skilled in the art, for which reason they will not be described in greater detail here.

FIG. 45B is a sectional view of mechanism 1200.

FIG. 45C is another sectional view of mechanism 1200.

FIG. 46 shows several ways in which two arm sections can be rotatably engaged together, either by direct engagement as in FIG. 46A, or by engagements with other intermediate parts as in FIG. 46B or FIG. 46C. In FIG. 46B, both the sections on the left and right are engaged with intermediate part 5091. In FIG. 46C, 5092a and 5092b are rotatably mounted together; and 5092a will be inserted into the object on the left and 5092b to the object on the right. A locking (or securing) mechanism can be added to keep the linked arm sections from disengaging. For example, the locking mechanism can be a groove and tip mechanism as in FIG. 45; and in the case of FIG. 46C, a simple locking tip, a latch, a screw, or even superglue can be used to keep parts 5092a and 5092b from retreating from the inserted positions inside the left and right arm sections, respectively.

Friction Joint Mechanisms

In the figures (FIG. 47-FIG. 57) illustrating embodiments of the friction joint mechanisms of the present invention, we focus on the details of the friction mechanisms of the joints. We do not enumerate various ways for linking the arm sections, and engagement securing or locking mechanisms that can be applied, because both of these can be can easily be handled by people skilled in the art. For simplicity of presentation and drawing, we assume that an appropriate means including the ones listed above is used to prevent the linked parts from disengaging. Furthermore, the external shapes of the two linked hollow objects in the embodiments are for illustration purpose only; other external shapes are possible so long as the objects can be rotatably linked together.

Before presenting specific details of various embodiments of the mechanical friction joint mechanisms of the present invention, it would be helpful to discuss the general mechanisms first. FIG. 47-FIG. 55 illustrate a number of embodiments of a friction joint mechanism of the present invention for rotatably linking two hollow objects, a first object and a second object. These two objects can be two arm sections; and as shown in FIG. 52, they can also be an end section of an arm and a connection pivot that is built into the arm for mounting to the base or the display of a portable computer (for example, computer 5200 in FIG. 62). This friction joint mechanism allows the two linked objects to rotate relatively around a common axis. Along the rotation axis, there is a shaft with a deformed small diameter portion inserting into two groups of discs by the insertion holes on the individual discs. Referred to as the first group and the second group for convenience, each group includes one or more discs; and the discs of the first group are interposed with the discs of the second group. The discs are placed closely for frictional contact with one another. A fastening means such as a screw (or a screw nut) and optionally an elastic means such as a spring washer (or disc spring) are provided to tighten the frictional contact of the discs. The shaft is either a portion of the first object (as in the case of FIG. 55) or a separate piece that is firmly mounted to first object (as in FIG. 47-FIG. 54). The disks along with their engaged portion of the shaft are held inside the second object. The discs have such sizes and shapes, and they are mounted on the shaft and inside the second object in such a way that, when the first object rotates relatively to the second object, the first group of discs rotates in sync with the shaft and the second group of discs rotates in sync with the second object. Therefore, the rotational friction between the contacting discs of the two groups contributes to the friction of the joint mechanism. Furthermore, this friction joint mechanism allows a wiring cable to run from the inside of the first object to the inside of the second object, without leaving the enclosure of joint mechanism. In the embodiments illustrated in FIG. 47-FIG. 54, the wiring cable does not insert into the discs; and these embodiments vary slightly in how the two linked objects are angled relative to the rotation axis, for example, parallel to or perpendicular to the rotation axis. In the embodiment in FIG. 55, the shaft is a portion of the first object; and in this case, the wiring cable runs directly from the inside of the first object into the inside of the second object; and consequently the wiring cable indirectly inserts into the discs.

FIG. 56-FIG. 57 illustrate two embodiments of another friction joint mechanism of the present invention for linking two hollow objects, a first object and a second object. These two objects can be arm sections. This mechanism allows the objects to rotate around two parallel axes, a first axis and a second axis. Along the first and second rotation axes, there are two shafts, respectively referred to as the first shaft and the second shaft. These two shafts can be portions of the two linked objects (as in the case of FIG. 57); and they can also be separate pieces firmly mounted to the respective objects (as in FIG. 56). The joint mechanism also includes three groups of discs, a first group, a second group, and a third group. Each group has one or more discs. Each of the discs in the first and the second groups has an insertion hole; while each of the discs in the third group has a pair of insertion holes. A deformed small diameter portion of the first shaft inserts into the first group of discs by their insertion holes; and a deformed small diameter portion of the second shaft inserts into the second group of discs by their insertion holes. In addition, the two shafts both extend through each pair of insertion holes of the discs in the third group. The discs in the third group are interposed with the discs of the first group on the first shaft, and interposed with the discs of the second group on the second shaft. The discs are placed closely for frictional contact with one another. A fastening means such as a screw and optionally an elastic means such as a spring washer are provided to tighten the frictional contact of the discs on each shaft. The discs of the first and second groups have such sizes and shapes, and they are respectively mounted on the first and the second shafts in such a way that, when the first and second linked objects respectively rotate around the two rotation axes, the first group of discs rotates in sync with the first shaft, and the second group of discs rotates in sync with the second shaft; however, the third group of discs does not rotate around either of the two axes. Therefore, the rotational friction between the first and third groups of discs and the rotational friction between the second and third groups of discs contribute to the friction of this joint mechanism. Optionally, an enclosure can added to house the three groups of discs as well as their engaged portions of the two shafts. Furthermore, this friction joint mechanism allows a wiring cable to run from the inside of the first object to the inside of the second object, without leaving the enclosure of joint mechanism. In the embodiment illustrated in FIG. 56, the wiring cable does not insert into the discs. In the embodiments illustrated in FIG. 56-FIG. 57, the two linked objects are angled perpendicular to the two rotation axes.

We now describe the mechanical implementation of the friction joint mechanisms of the present invention in more specific details.

FIG. 47 shows an embodiment of a friction joint (5000) of the present invention.

FIG. 47A is an exploded view of the friction joint mechanism. The two hollow objects linked together are 5033 and 5034. 5080 is a shaft that is firmly mounted inside 5033; and at the portion (5080a) for mounting, a pass way is reserved for the wiring cable to bypass the friction mechanism. Spring washer 5010 and screw 5020 are included for tightening the frictional contact of the discs, as shown in FIG. 47E.

FIG. 47B shows that the shaft has a deformed small diameter portion 5080c with screw thread at the end. There are two groups of discs, 5050 and 5060, which are interposed.

FIG. 47C shows the cross section views of the deformed small diameter portion of shaft and the discs in group 5050 and 5060. A disc in group 5050 has a circular edge and a deformed insertion hole that matches the deformed shape of small diameter portion 5080c. A disc in group 5060 has a circular insertion hole and a shape that matches the shape of cavity 5034a. Because the matching of the shapes (and sizes), when 5033 and 5034 rotate relatively to each other, the discs in group 5050 rotate in sync with 5033, and discs in group 5060 rotate in sync with 5034.

FIG. 47D is a perspective view of the joint when 5033 and 5034 rotatably linked together.

FIG. 47E is a sectional view of the joint; it shows how the discs of groups 5050 and 5060 are interposed with frictional contact tightened by spring washer 5010 and screw 5020, engaged with shaft 5080, and held inside 5034. Dashed line 5070 shows how a wiring cable can run from the inside of 5033 to the inside of 5034, bypassing the discs, the spring washer, and the screw using pass way 5071, without leaving the enclosure of the joint mechanism.

FIG. 47E shows that simple variations are possible by altering the shape of the discs in group 5060 and the shape of the cavity in 5034.

FIG. 48 shows a friction joint (5000A), which is a slight variation of friction joint 5000 by adding an intermediate part (5091) for engaging 5033 and 5034. The rest of the details are similar to FIG. 47. FIG. 48A is an exploded view; FIG. 48B is a perspective view; and FIG. 48C is a sectional view.

FIG. 49 shows a friction joint (5000B), which is another slight variation of friction joint 5000. In this variation, 5033 and 5034 are engaged indirectly by engaging with the shaft and the discs. To secure the engagement, cap 5090 is mounted on object 5034 to prevent the discs from backing out the insertion inside 5034. The rest of the details are similar to FIG. 47. FIG. 49A is an exploded view; FIG. 49B is a perspective view; and FIG. 49C is a sectional view.

FIG. 50 shows an embodiment of a friction joint (5100) of the present invention. The two linked hollow objects are 5133 and 5134. FIG. 50A is an exploded view; FIG. 50B is a different perspective view of 5133. FIG. 50C is a perspective view of the joint; and FIG. 50D is a sectional view. The basic idea here is the same as that of friction joint 5000 (FIG. 47); and for those components that are the same as in FIG. 47, such as the discs, the spring washer, and the screw, we use the same labels. There are a few minor differences. Here, the shaft (5180), firmly mounted on 5133, is perpendicular to 5133. For variation, we choose different external shapes for 5133 and 5134; and it would not affect the functionality of the joint if they had circular external shapes. Dashed line 5170 shows how a wiring cable can run from the inside of 5133 to the inside of 5134, bypassing the discs, the spring washer, and the screw using pass way 5171, without leaving the enclosure of the joint mechanism. Notice here how the cable can go around the shaft (5180) inside 5133.

FIG. 51 shows an embodiment of a friction joint (5300) of the present invention. FIG. 51A is an exploded view; FIG. 51B is a perspective view; and FIG. 51C is a sectional view. The two linked hollow objects are 5333 and 5334. The basic idea here is the same as that of friction joint 5000 (FIG. 47) except that the wiring cable here does not need to bypass the friction mechanism using a pass way in 5334, because as the cable enters the joining portion, it goes in the opposite direction of the friction mechanism residing in portion 5334a. For those components that are the same as in FIG. 47, such as the discs, the spring washer, and the screw, we use the same labels. There are a few other minor differences. Here, the shaft (5380) is perpendicular to the extended portion of 5334. For variation, we choose a different external shape for the extended portion of 5334; and it would not affect the functionality of the joint if it had a circular external shape. Dashed line 5370 shows how a wiring cable can run from the inside of 5333 to the inside of 5334, without leaving the enclosure of the joint mechanism. Notice here how the cable can go around the shaft (5380) inside 5333.

FIG. 52 shows an embodiment of a friction joint mechanism (5400) of the present invention. Such a mechanism can be built into the ends of a multi-sectioned arm for pivotally mounting the arm to the base and the display of a portable computer (for example, computer 5200 in FIG. 62). The two linked objects are 5433 and 5441. FIG. 52A is an exploded view; FIG. 52B is a different perspective view of 5433. FIG. 52C is a perspective view of the joint; and FIG. 52D is a sectional view. The basic idea here is the same as that of friction joint 5100 (FIG. 50) except that the wiring cable here does not need to bypass the friction mechanism using a pass way in 5441, because the cable exits 5441 at hole 5471. For those components that are the same as in FIG. 50, such as the discs, the spring washer, and the screw, we use the same labels. Dashed line 5470 shows how a wiring cable can run from the inside of 5433 to the inside of 5441, and exit at insertion hole 5471 (potentially entering another object, such as the display or the base of the portable computer of the present invention). Notice here how the cable can go around the shaft (5480) inside 5433.

FIG. 53 shows an embodiment of a friction joint (5500) of the present invention. The two linked objects are 5533 and 5534. FIG. 53A is an exploded view; FIG. 53B is a different perspective view of 5533. FIG. 53C is a perspective view of the joint; and FIG. 53D is a sectional view. The basic idea here is the same as that of friction joint 5100 (FIG. 50). For those components that are the same as in FIG. 50, such as the discs, the spring washer, and the screw, we use the same labels. There are a few minor differences. The extended portions of the 5533 and 5534 are parallel to each other; and they are placed on the same side of the friction mechanism; and this allows the wiring cable (5570) to run from the inside of 5433 to the inside of 5534, without having to bypass the friction mechanism in portion 5434a. Notice here how the cable can go around the shaft (5580) inside 5333.

FIG. 54 shows an embodiment of a friction joint (5600) of the present invention. The two linked objects are 5633 and 5634. FIG. 54A is an exploded view; FIG. 54B is a different perspective view of 5633. FIG. 54C is a perspective view of the joint; and FIG. 54D is a sectional view. As far as the friction mechanism is concerned, the basic idea here is the same as that of friction joint 5500 (FIG. 53). For those components that are the same as in FIG. 53, such as the discs, the spring washer, and the screw, we use the same labels. There is one noticeable difference: the two linked objects here have special shapes. These special shapes give the effect that the extended portions of the two linked objects can rotate relatively to each other, and that their rotation is confined within two (imaginary) parallel planes separated by a distance equal to the identical heights of their elongated portions. Externally, hollow object 5633 has an opening at one end (5633h) of its elongated portion, and at the other end it has two concentric cylindrical portions 5633a and 5633b with a common opening; and internally there is a tunnel that starts at 5633h, runs through the entire elongated portion, enters 5633a, and exits at the common opening of 5633a and 5633b. Hollow object 5634 has an opening at one end (5634h) of its elongated portion, and at the other end it has two portions 5634a and 5634b with a common opening; and internally there is a tunnel that starts at 5634h, runs through the entire elongated portion, enters 5634a, and exits at the common opening of 5634a and 5634b. Portion 5634a holds the disks, the spring washer, and the screw. The external size and circular shape of 5633b match those internal ones of 5634b so that they can be nested as concentric cylinders; and this rotatably links 5633 and 5634 together. Dashed line 5670 shows how a wiring cable can run from the inside of the elongated portion of 5633, through the inside of 5633a and 5633b, into the inside of 5634a, and further into the inside of the elongate portion of 5634, without leaving the enclosure of the joint. Notice here how the cable (5670) goes around shaft 5680 inside 5633a and 5633b.

FIG. 55 shows an embodiment of a friction joint (5700) of the present invention. FIG. 55A is an exploded view; FIG. 55B is a perspective view; and FIG. 55C is a sectional view. The two linked objects are 5733 and 5734. The basic idea here is the same as that of friction joint 5000B (FIG. 49). A noticeable difference is that the "hollow shaft" here is served by a deformed small diameter portion (5733a) of 5733. We use different labels here for the discs (5750 and 5760), the spring washing (5710), the screw (5720), and the cap (5790); but they serve basically the same functions as their counterparts in joint 5000B (FIG. 49). Because the "shaft" is hollow, there is no need to have a pass way for the wiring cable to bypass the friction mechanism; the cable can simply runs inside the "shaft" and therefore the friction mechanism.

FIG. 56 shows an embodiment of a friction joint (5800) of the present invention. FIG. 56A is an exploded view. The two linked hollow objects are 5837 and 5838, each having a tunnel to allow the wiring cable to run through. Two shafts 5887 and 5888 are firmly mounted on the 5837 and 5838, respectively. Shafts 5887 and 5888 respectively have deformed small diameter portions 5887c and 5888c, each having screw thread at the end. There are three groups of discs: upper row of 5850 engaged with 5887, and lower row of 5850 engaged with 5888, and 5860 engaged with both 5887 and 5888. The discs from different groups are interposed and placed closely for frictional contact. A pair of spring washers (5810) and a pair of screws (5820) are respectively engaged with 5887c and 5888c to tighten the frictional contact between the discs. Component 5872 is optional; and when included, it is used to enhance the structural stability of the mechanism and also to prevent the edges of 5837a and 5838a from "cutting" the cable during rotation.

FIG. 56B is a perspective view of 5837. The corresponding perspective view of 5838 would be similar.

FIG. 56C shows perspective split views of 5887 and 5888. Shafts 5887 and 5888 respectively have deformed small diameter portions 5887c and 5888c for engaging with the discs. Both 5887c and 5888c have screw threads at the ends.

FIG. 56D shows the cross section views of the deformed small diameter portions of the shafts 5887c and 5888c, and the discs in group 5850 and 5860. A disc in group 5850 has a circular edge and a deformed insertion hole that matches the deformed shapes of small diameter portion 5887c and 5888c. A disc in group 5860 has two circular insertion holes. Because the matching of the shapes (and sizes), when 5837 and 5838 respectively rotate around shafts 5887 and 5888, the upper row of discs in group 5850 rotates in sync with 5837, the lower row of discs in group 5850 rotates in sync with 5838, while discs in group 5060 do not rotate with either of the shafts. The rotational friction between the two rows of discs in group 5850 against the discs in group 5860 contributes the friction of the joint mechanism.

FIG. 56E is a perspective view of joint 5800 when the 5837 and 5838 are linked together.

FIG. 56F is a sectional view of the joint mechanism. The dashed line (5870) shows how a wiring cable can run from the inside of 5837 to the inside of 5838.

FIG. 56G and FIG. 56H illustrate that cover 5840 is optional. The mechanism can function even without 5840.

FIG. 56I shows that shafts can be mounted differently on the two hollow objects (relabeled as 5834 and 5835 from 5837 and 5838, respectively), in a way similar to how shaft 5080 is mounted on 5033 in joint mechanism 5000 as shown in FIG. 47.

FIG. 57 shows an embodiment of a friction joint (5900) of the present invention. FIG. 57A is an exploded view; FIG. 57B is a perspective view; and FIG. 57C is a perspective view; and FIG. 57D is a sectional view. The two linked objects are 5937 and 5738. The basic idea here is the same as that of friction joint 5800 (FIG. 56). A noticeable difference is that the "hollow shafts" here are served by deformed small diameter portions of 5937a and 5938a. We use different labels here for the discs (5950 and 5960), the spring washing (5910), the screw (5920), and the cover (5940) along with its cap (5941); but they serve basically the same functions as their counterparts in joint 5800 (FIG. 56). Dashed line 5970 shows how a wiring cable can run from inside of 5937 to inside of 5938. Component 5972 is optional; and when included, it is used to enhance the structural stability of the mechanism and also to prevent the edges of 5937a and 5938a from "cutting" the cable during rotation.

FIG. 58 shows some of the possible ways how friction joint mechanism 5000 can be used in connecting two arm sections of the various extensions.

FIG. 59 shows some of the possible ways in which how friction joint mechanism 5000 as well as 5100 can be used to create combo joints.

Support for Joint Notations in FIG. 2

Up to this point, we have presented mechanical joints to support the rotatable joint notation in FIG. 2. The following is a summary.

Notation in FIG. 2A can be implemented by joint 5500 (FIG. 53), or the mechanism in FIG. 58D.

Notation in FIG. 2B can be implemented by joints 5600 (FIG. 54).

Notation in FIG. 2C can be implemented by joints 5800 (FIG. 56), 5900 (FIG. 57), and the mechanism in FIG. 58F.

Notation in FIG. 2D can be implemented by joints 5000 (FIG. 47), 5000A (FIG. 48), 5000B (FIG. 49), and 5700 (FIG. 55).

Notation in FIG. 2F can be implemented by combo-joints shown in FIG. 59A and FIG. 59B.

Notation in FIG. 2G can be implemented by joints 5100 (FIG. 50) and 5300 (FIG. 51).

A Method for Installing Wiring Cables in Multi-Sectioned Arms

FIG. 60 presents a method for assembling multi-sectioned arms with embedded wiring cable when the cable used is pre-connected with connectors at the ends.

FIG. 60A shows a wiring cable (5275) that is pre-connected with connectors 5275a, 5275b, and 5275c at its ends. This is typical of the wiring cables between the displays and the bases for many of the today's notebook computers based on the conventional clamshell design. The figure also shows some solid pieces, 5294a and 5294b, 5295a and 9295b, and 5296a and 5296b, for constructing hollow objects that the wiring cable needs to run through. At least two of the connectors (5275a and 5275b) on the opposite ends of the wiring cable (parallel cable) are too large to pass through the narrow tunnels of the objects after the separate solid pieces are merged into the desirable objects. The method here is to place the wiring cable before merging the separate solid pieces. Different from other hollow objects in the figure, 5293 is not constructed from separate solid pieces. As amplified in FIG. 60F, object 5293 has a narrow gap 5293a along its tunnel. To run the entire cable through the tunnel of 5293, the method here is to slide through the gap at 5293a, one by one, wires of the cable. The width of the slide-through gap (i.e. 5293a) needs to be just slightly wider than the diameter of each individual wire. (Note: For the parallel cable between the base and the display of today's typical notebook computer, each such wire is ultra-thin, usually about 0.5 mm in diameter or thinner.)

FIG. 60B is a perspective view of wiring cable 5275 running through the hollows objects that are merged together from the separate solid pieces as shown in FIG. 60A.

FIG. 60C shows how two solid pieces, 5294a and 5924b, can embrace to form a tunnel. FIG. 60D shows how 5295a and 5295b can form a circular tunnel by merging along their edges. FIG. 60E shows that 5296a can slide into 5296b to close the opening of 5296a.

In actually implementation, one possible combination would be to use separate pieces to form components that are exposed, and to use slide-through gaps for parts that are hidden after assembly.

The examples here are provided for illustrative purposes. There are many other ways to form a hollow object from two or more separate pieces. In merging separate solid pieces to form a hollow object, the formation can be secured using standard mechanisms such as screw, superglue, locking groove etc. After the cable is placed inside a hollow object, the slide-through gap, such as 5293a, should be filled, with a narrow strip, rubber glue etc. Such details are easy to people skilled in the art, and therefore not elaborated here.

Attachment of Multi-Sectioned Arms to the Base and the Display

FIG. 61 shows some possible ways for mounting a multi-sectioned arm to the base and the display of a portable computer of the present invention. A tunnel can be provided directly on the base (as shown in FIG. 61C) or the display so that an end section of the multi-section can be inserted. Alternative, an arm attachment mechanism can be mounted to the display and the base, as shown in FIG. 61A and FIG. 61B.

FIG. 61A shows that, using part 5246*c*, the arm attachment mechanism (5246) can be hung off the bottom of the display. The opening (5246*a*) on top of 5246 is for the wiring cable to pass between the arm and the base. Next to opening 5246*a* is a "slide-through gap" for the individual wires of the wiring cable to slide into 5246*a* (as discussed earlier in FIG. 60.) FIG. 61B shows that arm attachment mechanism (5247) can be mounted on the back edge of the base of the portable computer. Notice that, in actual implementations, such an arm attachment mechanism can also be mounted on other sides and edges of the base and the display.

FIG. 61C. shows that an insertion tunnel can be created on the base (and similarly on the display) of the portable computer of the present invention. Depending on whether or not it is desirable for the inserted portion of the arm section to rotate relatively to the tunnel, we can choose the shape of the tunnel to be of either cylindrical shape to allow relative rotation or a special shape matching that of the inserted portion to prevent relative rotation. In FIG. 61C, a cubical tunnel is chosen.

We should point out that the methods discussed here for mounting an attachment mechanism to the base and the display are also applied to directly mount the end sections or the built-in connection pivots of a multi-sectioned arm, as shown in FIG. 62.

Putting it all Together: a Complete Design of Multi-Sectioned Arms for a Portable Computer FIG. 62 presents a portable computer (5200) with two double-sectioned arms according to the present invention. Computer 5200 resembles portable computer 200 in FIG. 18A, allowing the same set of possible movements and configurations. This is to show how the mechanisms presented earlier can be used to implement the multi-sectioned arms of a portable computer of the present invention. Designs of the mechanical parts and the structures of the arms are presented in great details, including the joints, the hollow arm sections, wiring, and the connection pivots for mounting the arms on the display and the base of the computer.

FIG. 62A is a perspective front view of computer 5200. The computer is in an open position with the arms fully stretched in the vertical direction, screen 98 facing the user, and keyboard 87 facing upward. The two arms are similar, and therefore we only present the details of the left arm. There are four pivotal axes. Pivotal axis 5221 around 5241 supports the relative rotation of display 90 and the upper sections of the arms (5237 and its counterpart on the right arm). Pivotal axis 5224 around 5242 supports the relative rotation of the lower sections of the arms (5238 and its counterpart on the right arm) and base 80. Pivotal axes 5222 and 5223 at joint 5240 support the relative folding and stretching of the upper and lower arm sections.

Figures 62, 62B:
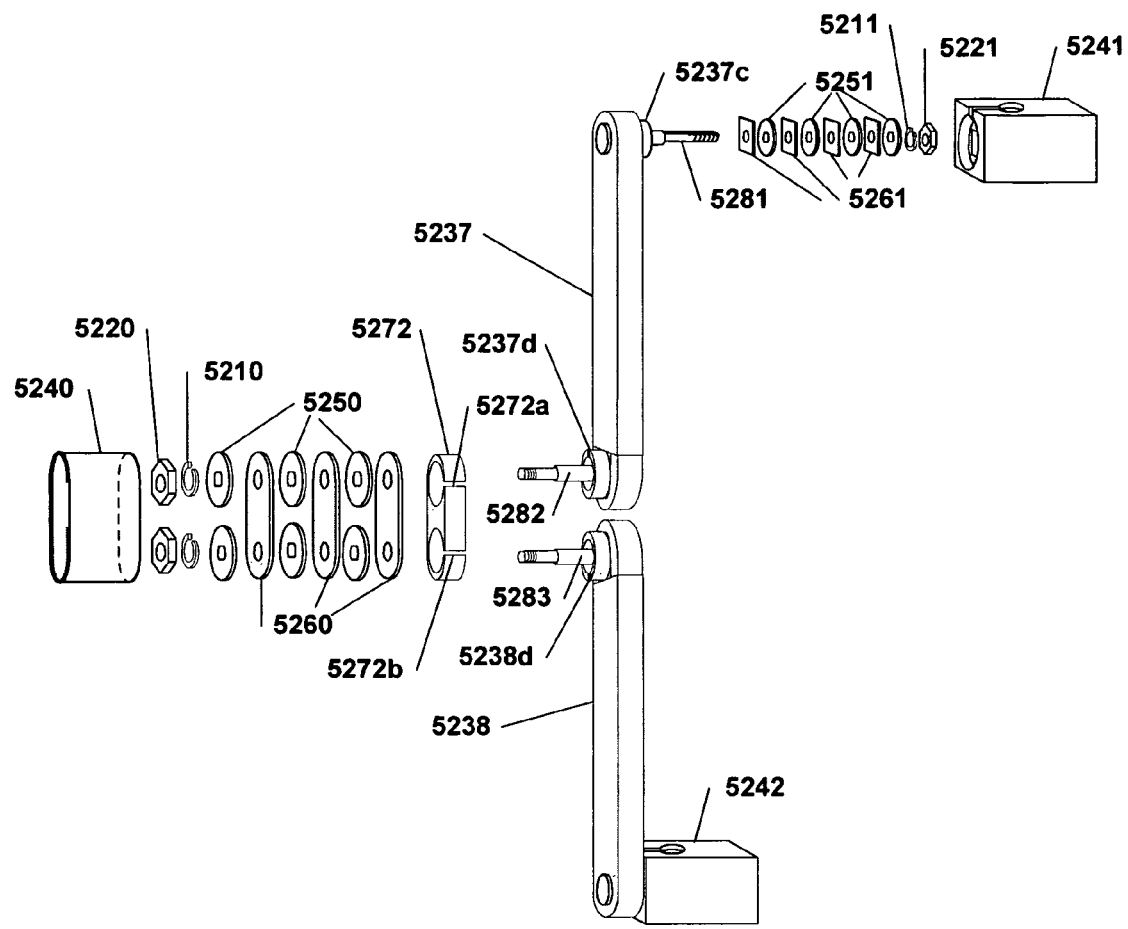

FIG. 62B is a partially exploded view of the left arm of computer 5200. Details of the lower connection pivot (5242) are not shown, its structure similar to that of the upper connection pivot, with the possible exception of having different number of discs due to different friction needs.

The middle joint (with cover 5240) is based on friction joint mechanism 5800 in FIG. 56, although the parts are given different labels here from those in FIG. 56. Specifically, 5250 represents two rows of discs for engaging with shafts 5282 and 5283, respectively; 5260 is the group of the discs for engaging with both shafts simultaneously; and 5220 and 5210 are a pair of spring washer and screw for tightening the frictional contact of the discs in group 5250 and 5260. Part 5272 provides additional stability of the structure and protects the wiring from the edges of 5237*d* and 5238*d* during arm rotation. Compared to FIG. 56, one special feature here is the slide-through gaps (5272*a* and 5272*b*) on part 5272. Such gaps are used for installation of a wiring cable that is pre-connected with connectors on its ends (as discussed earlier in details in FIG. 60).

The upper connection pivot (with cover 5241) is based on mechanism 5400 in FIG. 52, although its components are given different labels here from those in FIG. 52. Specifically, 5251 is the group of discs for engaging with shaft 5281; 5261 is the group of discs for engaging the inside of 5241; and spring washer 5211 and screw 5221 are used to tighten the frictional contact between friction discs in groups 5251 and 5261.

FIG. 62C shows the external structure of the connection pivot (5241). The structure and function of this part is similar to 5441 in joint mechanism 5400 in FIG. 52. The difference here is the slide-through gap (5241*a*) useful for wiring cable installation (as discussed earlier in details in FIG. 60).

FIG. 62D shows two perspective views of hollow part 5237*c*. Part 5237*d* (not shown in this figure) is similar in structure. There is a slide-through gap and a wider opening along the gap on part 5237*c*. The slide-through gap is for cable installation. The wider opening is used after installation to receive the wiring cable from the tunnel in the elongated portion of section 5237.

FIG. 62E shows the structure of shaft 5281. It has a large diameter top portion 5281*a*, a cubical portion 5281*b* (matching the shape of insertion hole 5237*h* on the top portion of 5237*a*), a mid portion 5281*c* (of cylindrical shape so as to minimize the wearing with the wiring cable during rotation), and deformed small diameter portion 5281*d* with screw thread at the end.

FIG. 62F is an exploded view of arm section 5237. It shows how hollow arm section 5237 is composed of separate solid parts. Specifically, the elongated portion of the 5237*b* is embraced by 5237*a* to form the elongated portion of 5237. (This idea is similar to the one shown in FIG. 60C.) Shaft 5281 inserts into insertion hole 5237*h*. The mounting portion (5281*b*) of the shaft matches 5237*h* in size and shape, so that shaft 5281 does not rotate relative to 5237 after installation. Part 5237*c* is inserted in the top hollow portion of 5237*a* so that shaft 5281 also inserts into 5237*c*. Part 5237*c* is hollow and has an opening and a slide-through gap on the side. The opening is for the wiring cable to come through from 5237*c* after installation; and the slide-through gap is needed for wiring cable installation (as discussed earlier in details in FIG. 60.) The installations of part 5237*d* and shaft 5282 are similar to those of 5237*c* and shaft 5281, respectively.

FIG. 62G shows three perspective views of 5237*a*, from an angle (between the front and a side), from the front, and from the back.

FIG. 62H shows three perspective views of 5237*b*, side view, front view, and back view. On the top portion of 5237*b*, there is an insertion hole (5237*i*).

It should be mentioned that the drawings are for illustrative purposes only; and in actual implementation, the relative sizes of the components do not have to be proportional to those in the drawings.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A multi-sectioned arm for connecting the display and the base of a portable electronic device, comprising, two or more sections linked together, including at least one said section for connecting to said base and at least one said section for connecting to said display; wherein when said arm is connected to said base and said display and when said base is horizontal, two or more said sections are relatively rotatable around one or more horizontal rotational axes, and said arm has a motion that is capable of opening and folding said display from and against said base, and moving said display substantially, relative to the back edge of said base, in at least one direction selected from the group consisting of: an up and down direction, a forward and backward direction, and a left and right direction; when said display is substantially elevated relative to said base and having the same viewing orientation as a conventional viewing position, the viewing angle of said display can be tilted around a horizontal tilting axis that is substantially non-parallel to at least one of said horizontal rotational axes.

2. The multi-sectioned arm of claim 1, wherein when connected to said base and said display, said arm allows said display to be set to both portrait and landscape viewing orientations.

3. The multi-sectioned arm of claim 1, further comprising an embedded wiring cable for transmitting power or signal between said base and said display.

4. The multi-sectioned arm of claim 1, wherein some of said sections are linked together extendably and contractibly.

5. The multi-sectioned arm of claim 1, further comprising at least one built-in connection pivot for connecting to said base or said display.

6. The multi-sectioned arm of claim 1, wherein said multi-sectioned arm is capable of moving said display along a straight line direction relative to said base.

7. A connection mechanism for connecting the display and the base of a portable electronic device, comprising: two or more rotatably linked sections; wherein said connection mechanism allows said display to move relative to said base along a straight line direction through relative rotations of said linked sections around rotational axes; and wherein when said display is in a conventional viewing position, said display can be tilted around a horizontal tilting axis that is substantially non-parallel to at least one of said rotational axes that are horizontal.

8. The connection mechanism of claim 7, wherein further allowing said display to move up and down relative to said base.

9. The connection mechanism of claim 7, wherein when connected to said base and said display, said display can be set to both portrait and landscape viewing orientations.

10. The connection mechanism of claim 7, further comprising wiring for transmitting power or signal between said base and said display.

11. The connection mechanism of claim 7, comprising extendably and contractibly linked sections.

* * * * *